US010841030B2

(12) United States Patent
Kliger et al.

(10) Patent No.: US 10,841,030 B2
(45) Date of Patent: Nov. 17, 2020

(54) LEG COMBINING BY FFT SELECTION

(71) Applicant: Avago Technologies International Sales Pte. Limited, Singapore (SG)

(72) Inventors: Avi Kliger, Airport City (IL); Anatoli Shindler, Airport City (IL); Giuseppe Cusmai, Irvine, CA (US); Eliran Hania, Airport City (IL); Steven Jaffe, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 39 days.

(21) Appl. No.: 16/049,218

(22) Filed: Jul. 30, 2018

(65) Prior Publication Data

US 2020/0036463 A1    Jan. 30, 2020

(51) Int. Cl.
*H04J 1/12*    (2006.01)
*H04L 12/28*    (2006.01)

(52) U.S. Cl.
CPC ............ *H04J 1/12* (2013.01); *H04L 12/2801* (2013.01)

(58) Field of Classification Search
None
See application file for complete search history.

(56) References Cited

U.S. PATENT DOCUMENTS

| | | | | |
|---|---|---|---|---|
| 5,799,270 A * | 8/1998 | Hasegawa | ........... | G10L 19/0212 704/200.1 |
| 6,785,339 B1 * | 8/2004 | Tahernezhaadi | .... | H04W 88/181 370/286 |
| 7,436,897 B2 * | 10/2008 | Sanada | ................ | H04B 7/0874 370/208 |
| 7,583,736 B2 * | 9/2009 | Miyoshi | ................ | H04L 1/0041 375/260 |
| 8,050,398 B1 * | 11/2011 | Xu | ........................ | H04M 9/082 379/392 |
| 8,059,736 B2 * | 11/2011 | Jeong | .................. | H04L 27/2657 375/260 |
| 8,135,079 B2 * | 3/2012 | Park | .................... | H04L 27/2647 375/227 |
| 8,290,105 B2 * | 10/2012 | Nagata | .................... | H04L 5/026 327/141 |
| 8,451,709 B2 * | 5/2013 | Hamaguchi | ............... | H04L 1/06 370/208 |

(Continued)

*Primary Examiner* — Gregory B Sefcheck
(74) *Attorney, Agent, or Firm* — Foley & Lardner LLP

(57) ABSTRACT

In some aspects, the disclosure is directed to methods and systems for improving signal to noise ratios of signals from multiple communication links. In some embodiments, a system includes a first frequency transformation circuit configured to transform a first signal in a time domain received from a first device into a corresponding second signal in a frequency domain. The system further includes a second frequency transformation circuit configured to transform a third signal in the time domain received from a second device into a corresponding fourth signal in the frequency domain. The system further includes a leg combining circuit configured to select, for a group of subcarriers, one of the first frequency transformation circuit and the second frequency transformation circuit, and cause, for the group of subcarriers, the selected frequency transformation circuit to output one of the second signal and the fourth signal, according to the selection.

20 Claims, 14 Drawing Sheets

(56) References Cited

U.S. PATENT DOCUMENTS

| | | | | |
|---|---|---|---|---|
| 8,467,462 B2* | 6/2013 | Hamaguchi | | H04L 1/0072 |
| | | | | 375/136 |
| 8,817,691 B2* | 8/2014 | Zhang | | H04B 7/15592 |
| | | | | 370/315 |
| 8,837,559 B2* | 9/2014 | Jovanovic | | H04L 27/26 |
| | | | | 375/211 |
| 8,982,744 B2* | 3/2015 | Sanyal | | G10L 19/0019 |
| | | | | 370/286 |
| 9,143,312 B2* | 9/2015 | Taylor | | H04L 7/0087 |
| 9,209,898 B1* | 12/2015 | Schemmann | | H04B 1/10 |
| 9,237,225 B2* | 1/2016 | Garcia | | H04M 3/002 |
| 9,363,109 B2* | 6/2016 | Cai | | H04L 25/02 |
| 9,502,046 B2* | 11/2016 | Purnhagen | | G10L 19/008 |
| 9,621,299 B2* | 4/2017 | Ishihara | | H04B 10/25133 |
| 9,672,821 B2* | 6/2017 | Krishnaswamy | | G10L 15/20 |
| 10,382,189 B2* | 8/2019 | Shi | | H04B 3/232 |
| 10,491,249 B2* | 11/2019 | Hewavithana | | H04L 12/2801 |
| 10,504,530 B2* | 12/2019 | Shi | | H04N 19/179 |
| 10,523,270 B1* | 12/2019 | Chapman | | H04L 12/2801 |
| 10,567,036 B2* | 2/2020 | Chapman | | H04B 3/234 |
| 10,574,426 B2* | 2/2020 | Kolze | | H04L 12/2801 |
| 2002/0057791 A1* | 5/2002 | Piket | | H04B 3/234 |
| | | | | 379/417 |
| 2005/0047325 A1* | 3/2005 | Singh | | G06F 17/142 |
| | | | | 370/210 |
| 2006/0002547 A1* | 1/2006 | Stokes | | H04M 9/082 |
| | | | | 379/406.14 |
| 2006/0223476 A1* | 10/2006 | Song | | H04B 7/0811 |
| | | | | 455/277.2 |
| 2010/0080114 A1* | 4/2010 | Ratnam | | H04L 5/0007 |
| | | | | 370/210 |
| 2011/0282676 A1* | 11/2011 | LeBlanc | | H04M 3/002 |
| | | | | 704/500 |
| 2012/0069989 A1* | 3/2012 | Lambert | | H04M 9/085 |
| | | | | 379/406.08 |
| 2019/0253154 A1* | 8/2019 | Jones | | H04B 11/00 |

* cited by examiner

LEG COMBINING BY FFT SELECTION

FIELD OF THE DISCLOSURE

This disclosure generally relates to systems and methods for communication. In particular, this disclosure relates to systems and methods for receiving signals from multiple devices with improved signal to noise ratios in multiple wired communication links.

BACKGROUND OF THE DISCLOSURE

Proliferation of communication technology enables multiple devices to communicate with each other. For example, in cable modem deployments, a plurality of client devices may communicate with a host device, at least partly over the same physical connection. In one configuration, a node operated by a network service provider is coupled via one or more physical interfaces to a plurality of taps (e.g., eighty taps), where each tap is connected to a plurality of network devices such as routers, switches or cable modems. To provide high bandwidth (e.g., 10 Gbps or higher) to each network device, a frequency division multiplexing technique may be employed.

Communication via an orthogonal frequency division multiple access (OFDMA) allows different network devices to communicate in a shared or overlapping frequency range. For example, a group of taps may be coupled to a common wired communication link referred to as a distribution leg ("leg"). Each tap or a network device coupled to a leg communicates through a statically or dynamically assigned subcarrier within a frequency range of the leg. Taking advantage of orthogonality of different subcarriers, multiple taps may communicate through overlapping frequency ranges.

A node may combine signals from different legs to accommodate a communication through a larger number of network devices. For example, a node may be coupled to four legs in parallel, where each leg is coupled to a group of taps. Network devices coupled to a leg may communicate at a corresponding time slot or at a corresponding frequency range to avoid interference from different network devices coupled to different legs. However, noise or reflections from different legs may reduce signal to noise ratios at the node. This may limit the available frequencies that can be used simultaneously on any given leg, and reduce signal quality (e.g. requiring retransmissions or resulting in loss of data). Hence, frequency allocation among communicating devices may become complex and unwieldy.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
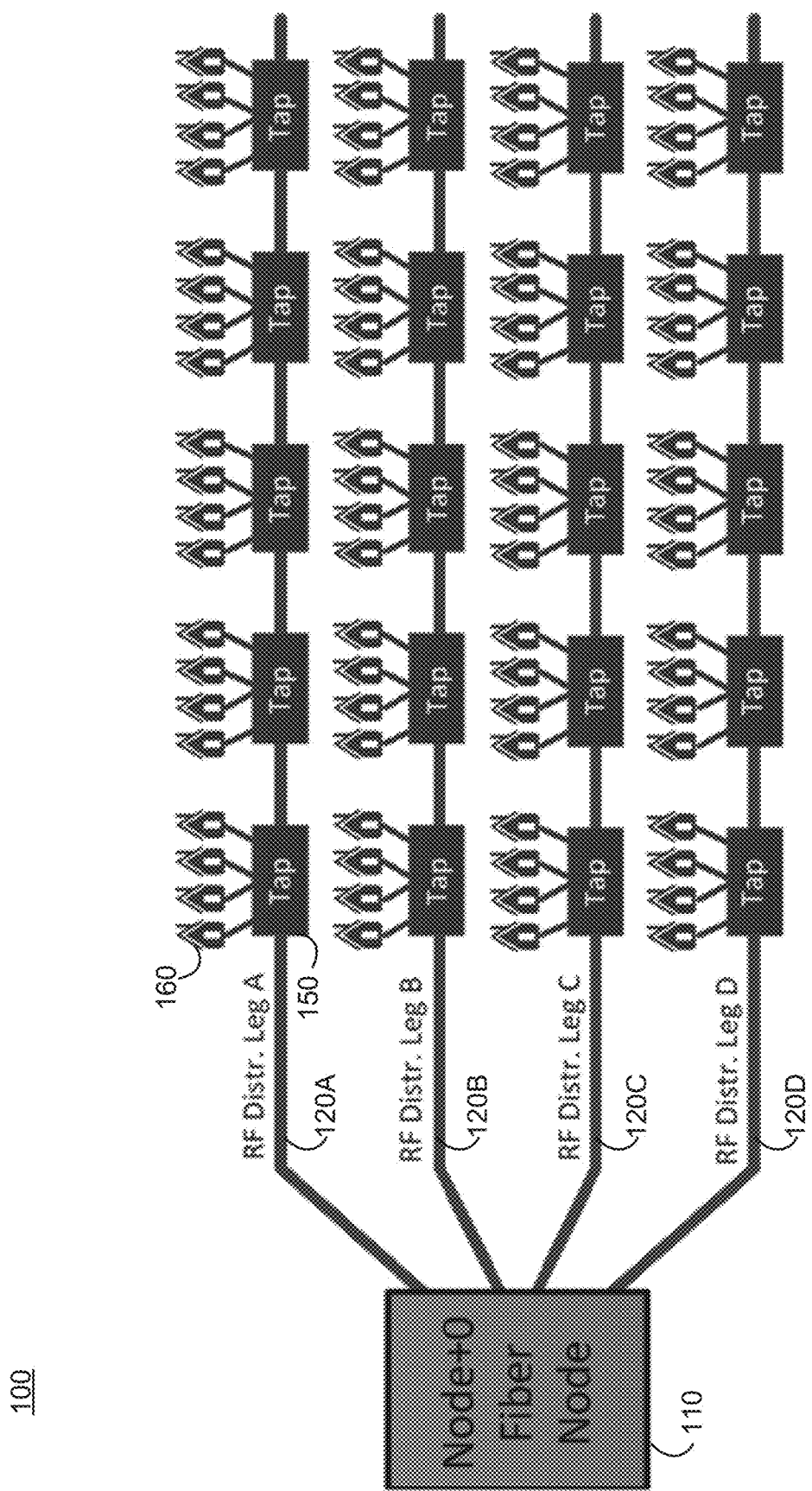
FIG. 1 is a diagram depicting an example communication network, according to some implementations.

The details of various embodiments of the methods and systems are set forth in the accompanying drawings and the description below.

DETAILED DESCRIPTION

The following standard(s), including any draft versions of such standard(s), are hereby incorporated herein by reference in their entirety and are made part of the present disclosure for all purposes: Data Over Cable Service Interface Specification DOCSIS 3.1. Although this disclosure may reference aspects of the above standard(s), the disclosure is in no way limited by the above standard(s).

For purposes of reading the description of the various embodiments below, the following descriptions of the sections of the specification and their respective contents may be helpful:

Section A describes embodiments of systems and methods for performing frequency transformation selection to improve signal to noise ratios in multiple communication links; and Section B describes a network environment and computing environment which may be useful for practicing embodiments described herein.

A. Systems and Methods for Performing Frequency Transformation Selection to Improve Signal to Noise Ratios in Multiple Communication Links Various embodiments disclosed herein are related to a method, a system, and a non-transitory computer readable medium storing instructions for performing frequency transformation selection to improve signal to noise ratios in multiple communication links.

In some aspects, the disclosure is directed to methods and systems for improving signal to noise ratios of signals from multiple communication links. In some embodiments, a system includes a first frequency transformation circuit configured to transform a first signal in a time domain received from a first device through a first leg into a corresponding second signal in a frequency domain. The system further includes a second frequency transformation circuit configured to transform a third signal in the time domain received from a second device through a second leg into a corresponding fourth signal in the frequency domain. Examples of frequency transformation performed include Fast Fourier Transform (FFT), Discrete Fourier Transform (DFT), etc. The system further includes a leg combining circuit configured to select one of the first frequency transformation circuit and the second frequency transformation circuit, and cause the selected one of the first frequency transformation circuit and the second frequency transformation circuit to output one of the second signal and the fourth signal, according to the selection. The output may be provided to a demodulation circuit for a subsequent decoding or demodulation.

Advantageously, by selecting a frequency transformation circuit to output, noise (e.g., white noise, burst noise, quantization noise, reflections, interferences, etc.) from different legs may be isolated. Hence, a signal to noise ratio at the demodulation circuit may be improved compared to adding different signals from different frequency transformation circuits.

In one aspect, the selection is performed in an autonomous manner. For example, the leg combining circuit detects power levels of frequency transformed signals (e.g., the second signal and the fourth signal), and selects the frequency transformation circuit rendering a higher power level. For another example, the leg combining circuit selects one or more frequency transformation circuits rendering a power level above a predetermined threshold. By automatically selecting a frequency transformation circuit to output, a signal from a leg associated with the selected frequency transformation circuit may be autonomously provided to a demodulation circuit, while isolating noise or reflections from other legs.

Referring to FIG. 1, illustrated is a diagram depicting an example communication network 100. In the network 100, a node 110 is coupled to four legs 120A, 120B, 120C, 120D in parallel. Although only four legs are illustrated, in many implementations, a greater or fewer number of legs may be utilized. The node 110 may be coupled to another node or other network (not illustrated). In one configuration, each leg 120 is coupled to multiple taps 150 in series, where each tap 150 is coupled to network devices 160 (e.g., routers, switches or modems) operated by users in parallel. Devices 160 may be deployed in residences, as shown, as well as at businesses or other enterprises, as well as in other locations (apartments, classrooms, etc.). Although only four devices 160 are shown connected to each tap 150, in many implementations, a greater or fewer number of devices 160 may be connected. Furthermore, each device 160 may be further coupled to a plurality of devices (e.g. switches, routers, modems, computing devices, smart televisions, video game consoles, home automation devices, Internet-of-Things (IoT) devices, etc.) In this configuration, the node 110 allows a large number (e.g., eighty or more) of network devices 160 to communicate with each other or with an external network. In other embodiments, a different number of legs 120, taps 150, and network devices 160 may be implemented by the network 100. In other embodiments, the legs 120, taps 150, and network devices 160 may be arranged in a different configuration than shown in FIG. 1.

A node 110 is a circuit or a system that enables taps 150 or network devices 160 to communicatively couple to each other or to an external network. In one aspect, the node 110 is operated by a service provider (e.g. broadband provider, cable provider, Internet Service Provider (ISP), etc.). The node 110 may be a fiber node conforming to DOCSIS 3.1 or a higher standard. The node 110 may accommodate communication of a large number of network devices 160 through multiple legs 120. In one aspect, the node 110 communicates with the taps 150 or the network devices 160 in different legs 120 through OFDMA to improve communication bandwidth. In particular, the node 110 may select FFT outputs of signals received through the legs 120 for reducing noise or reflection from other legs to improve signal to noise ratio. Additional descriptions of operations and implementations of the node 110 are provided below with respect to FIGS. 3 through 11.

A tap 150 is a component that enables a set of network devices 160 to communicatively couple to the node 110. In one aspect, the tap 150 splits a signal from the node 110, and forwards the split signals to a set of network devices 160. In another aspect, the tap 150 aggregates signals from the set of network devices 160, and forwards the aggregated signal to the node 110.

A network device 160 is a component that is operated by a user. Examples of the network device 160 include a router, a switch, a modem, etc. The network device 160 may be coupled to a computing device such as a laptop, a personal computer, a tablet computer, a smart phone, a TV, a speaker, etc., that are operated by a user. Through the network device 160, the computing devices can communicate with the node 110, other network devices 160 in the network 100 or other devices coupled to an external network.

Figure 11A:
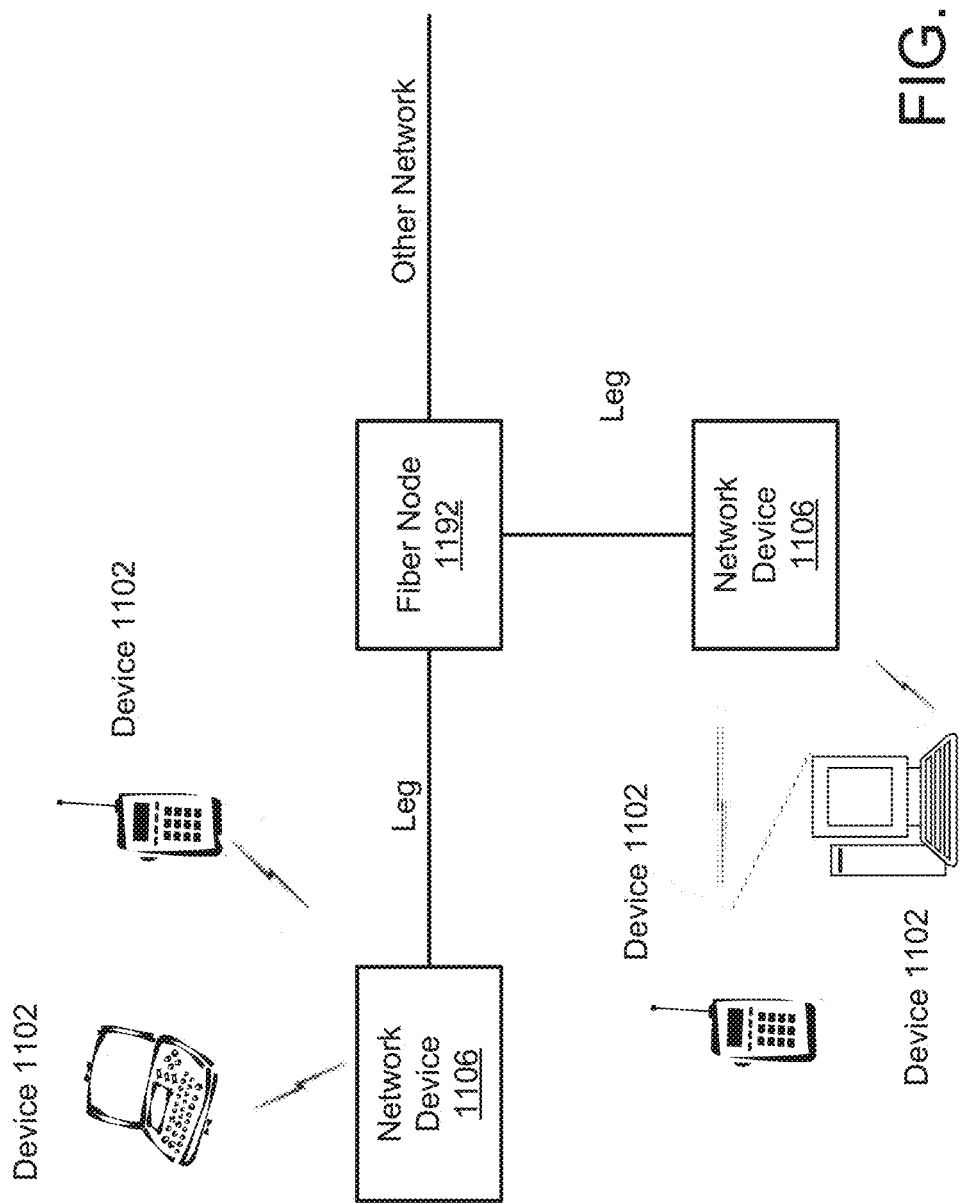
FIG. 11A is a block diagram depicting an embodiment of a network environment including one or more network devices in communication with one or more devices.

Additional examples and descriptions of the node 110, the network devices 160 and computing devices are provided below with respect to FIGS. 11A through 11C.

Figure 2:
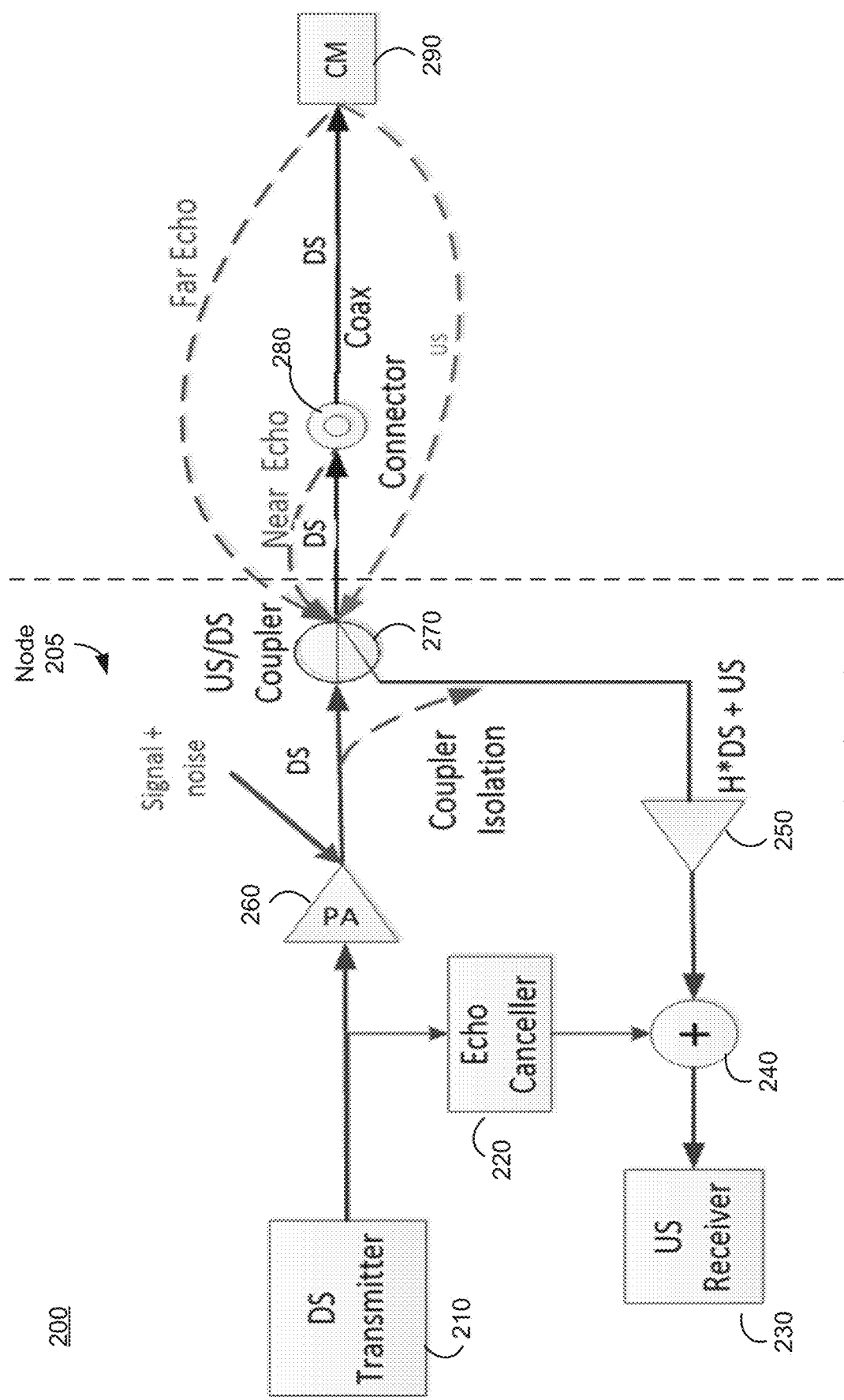
FIG. 2 is a diagram depicting a communication network of a node and a network device, according to one implementation.

Referring to FIG. 2, illustrated is a diagram depicting a communication network 200 of a node 205 and a single network device 290, according to one implementation. Although multiple network devices may be coupled to the node 205, a single network device 290 is shown for simplicity. In one configuration, the communication network 200 includes a downstream transmitter 210, an echo canceller 220, an upstream receiver 230, an adder 240, a front-end processing circuit 250, a transmit amplifier 260 (e.g., power amplifier), an upstream/downstream coupler 270, a connector 280, and a network device 290. In one aspect, the downstream transmitter 210, the echo canceller 220, the upstream receiver 230, the adder 240, the front-end processing circuit 250, the transmit amplifier 260, and the coupler 270 together constitute a node 205. These components of the node 205 may be disposed on one or more circuit boards. In other embodiments, the node 205 includes more, fewer, or different components than shown in FIG. 2. For example, additional components may be disposed between any of the coupler 270, the connector 280, the transmit amplifier 260, and the receiver 230. For example, the node 205 may lack the coupler 270, and the coupler 270 may be implemented as an external component.

The node 205 and the network device 290 communicate with each other in a bidirectional manner. The downstream transmitter 210 transmits a downstream signal to the transmit amplifier 260, and the transmit amplifier 260 amplifies the downstream signal. The transmit amplifier 260 outputs the amplified signal to the network device 290 through the coupler 270 and the connector 280. The network device 290 transmits an upstream signal through a cable to the connector 280 and the coupler 270. The front-end processing circuit 250 receives the upstream signal from the coupler 270, and processes the upstream signal by performing amplification, filtering, adding delay, performing analog-to-digital conversion, etc., to obtain a digital receive signal corresponding to the upstream signal. The front-end processing circuit 250 provides the receive signal to the upstream receiver 230. The upstream receiver 230 may decode or demodulate the upstream signal, and perform a corresponding action (e.g., store data, forward data, generate a response, etc.) according to the decoded or demodulate signal.

In one aspect, the upstream signal received by the node 205 may be degraded by a reflection. For example, the downstream signal output by the transmit amplifier 260 may be reflected back to the front-end processing circuit 250 through the coupler 270, the connector 280, and other components between the coupler and the connector, and/or from the cable network, and taps. Thus, the reflection of the downstream signal may be superimposed on the upstream signal. The reflection of the downstream signal superimposed on the upstream signal may reduce a signal to noise ratio at the upstream receiver 230.

To mitigate the degradation due to the reflections, a node 205 may implement the echo canceller 220 and the adder 240. In one configuration, the echo canceller 220 is coupled between the downstream transmitter 210 and the transmit amplifier 260, where the adder 240 is coupled between the front-end processing circuit 250 and the upstream receiver 230. The echo canceller 220 is a circuit that predicts or replicates a portion of the receive signal from the front-end processing circuit 250 corresponding to the reflections due to the transmit signal. Specifically, the echo canceller 220 receives the transmit signal from the downstream transmitter 210, and/or from the transmit amplifier 260 output, and generates a compensation signal by performing amplification, adding delay, and adaptive filtering, to the transmit signal to match a reflection of the downstream signal arriving at the adder 240 with an inverted sign. The adaptive filtering may be performed by a Least Mean Square (LMS) adaptive filter technique using output from the downstream transmitter 210 or the transmit amplifier 260 as the reference signal and the received upstream signal as the desired signal input. The adaptive filter can be performed by time domain filters or a frequency domain filtering using FFT and IFFT with overlap and save or overlap and add techniques. The adder 240 is a circuit that adds the compensation signal to the receive signal from the front-end processing circuit 250 to remove or reduce reflections superimposed on the upstream signal.

Figure 3A:
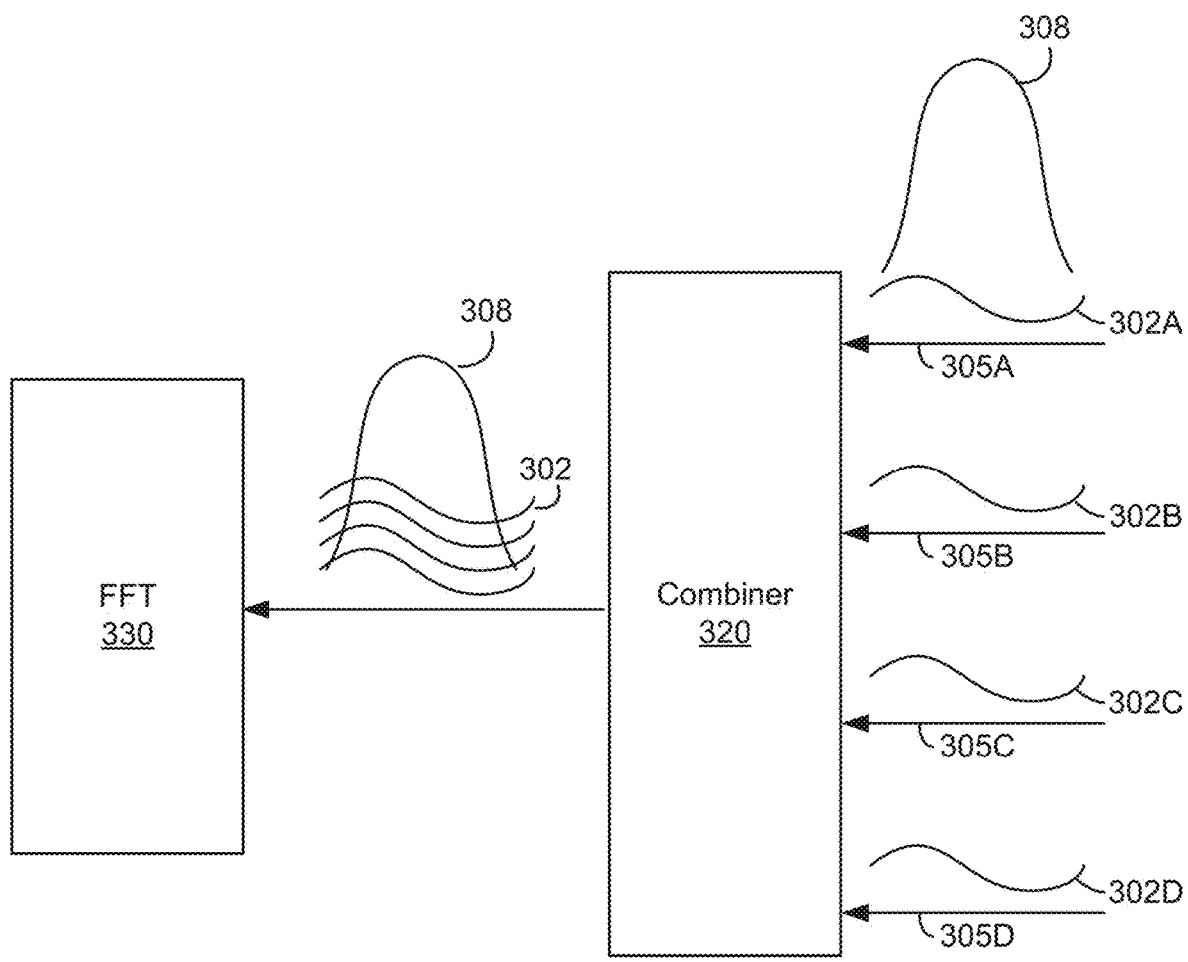
FIG. 3A is a block diagram depicting combining signals from four legs, according to one implementation.

Referring to FIG. 3A, illustrated is a block diagram depicting combining signals from four legs, according to one implementation. In one configuration, a node includes an FFT converter 330 and a combiner 320, where the combiner 320 is coupled between four legs and the FFT converter 330. In particular, the combiner 320 may be coupled to outputs of the four adders 240. In this configuration, the combiner 320 combines signals from four legs, and outputs an aggregated signal to the FFT converter 330. The FFT converter 330 may perform a frequency transformation (e.g., FFT transformation) on the signal output by the combiner 320, and provide the frequency transformed signal to a demodulation circuit (not shown) for a subsequent demodulation.

In OFDMA, per frequency (e.g., a single subcarrier or a group of subcarriers), each of the four legs may transmit at a corresponding time period. Hence, the combiner 320 can receive a signal 308 from one of the four legs, and forward the received signal 308 to the FFT converter 330 during the time period allocated to the first leg. However, the combiner 320 also aggregates noise 302A, 302B, 302C, 302D from the four legs. Such noise may include white noise, burst noise, reflections of signals, quantization noise, ingress noise from the cable plant and the customer premises, interference, etc., for example, from the various components shown in FIG. 2. The combiner 320 forwards the aggregated noise 302 to the FFT converter 330. Such aggregated noise reduces a signal to noise ratio at the FFT converter 330, and renders a subsequent demodulation performed by the demodulation circuit to be inaccurate.

Figure 3B:
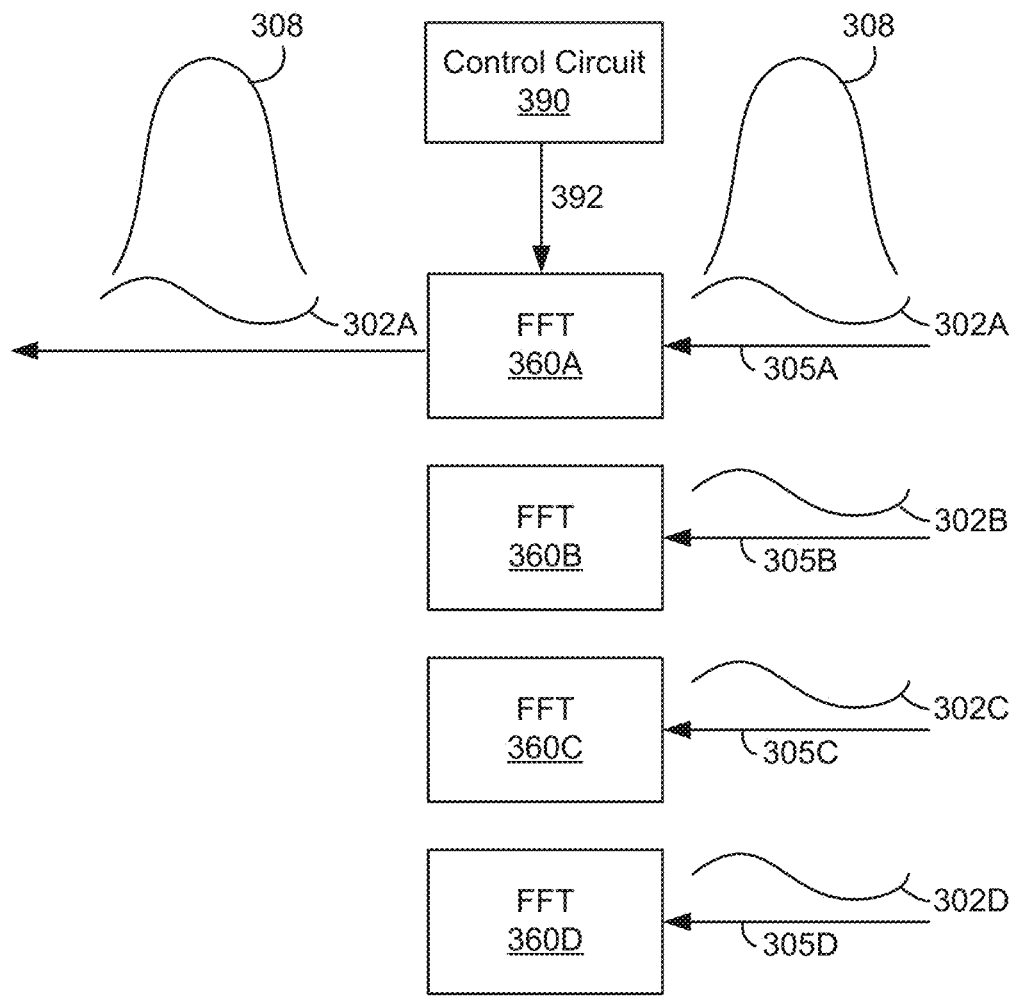
FIG. 3B is a block diagram depicting performing a frequency transformation selection of signals received through four legs, according to one implementation.

Referring to FIG. 3B, illustrated is a block diagram depicting a frequency transformation selection of signals received through four legs, according to one implementation. In one embodiment, a node includes FFT converters 360A, 360B, 360C, 360D and a control circuit 390. Each of the FFT converters 360A, 360B, 360C, 360D is coupled to a corresponding leg. Each FFT converter 360 may be coupled to an output of the adder 240, where outputs of the FFT converters 360A, 360B, 360C, 360D may be coupled to a demodulation circuit (not shown). In one aspect, the control circuit 390 selects one of the FFT converters 360A, 360B, 360C, 360D to output to the demodulation circuit. The control circuit 390 may configure, per OFDMA symbol, which subcarriers are selected from each FFT converters 360A, 360B, 360C, 360D. For example, a certain subcarrier group (e.g., a minislot or several minislots conforming to DOCSIS3.1) output from the FFT converters 360B, 360C, 360D is ignored when the same subcarrier group is selected from the FFT converter 360A output for a first OFDMA symbol. Similarly, a certain subcarrier group output from the FFT converters 360A, 360C, 360D may be ignored when the same subcarrier group is selected from the FFT converter 360B output for a second OFDMA symbol. Hence, noise from legs coupled to unselected FFT converters 360 may not be provided to the subsequent demodulation circuit. Moreover, noise (e.g., 302B, 302C, 302D) from legs coupled to unselected FFT converters 360 do not degrade demodulation performed by the demodulation circuit.

In one approach, the control circuit 390 automatically detects a presence of an upstream signal from a leg at a specific subcarrier group, and selects the FFT converter 360 coupled to the leg conveying the upstream signal in the specific subcarrier group. For example, the control circuit 390 detects power levels of signals in a frequency domain at outputs of the FFT converters 360A, 360B, 360C, 360D. The control circuit 390 may select, for a group of subcarriers, an FFT converter 360 having a highest power level at its output. Alternatively or additionally, the control circuit 390 selects one or more FFT converters 360, for a group of subcarriers, having power levels above a predetermined threshold level. The control circuit 390 may store and apply different threshold levels for different FFT converters 360.

Figure 4:
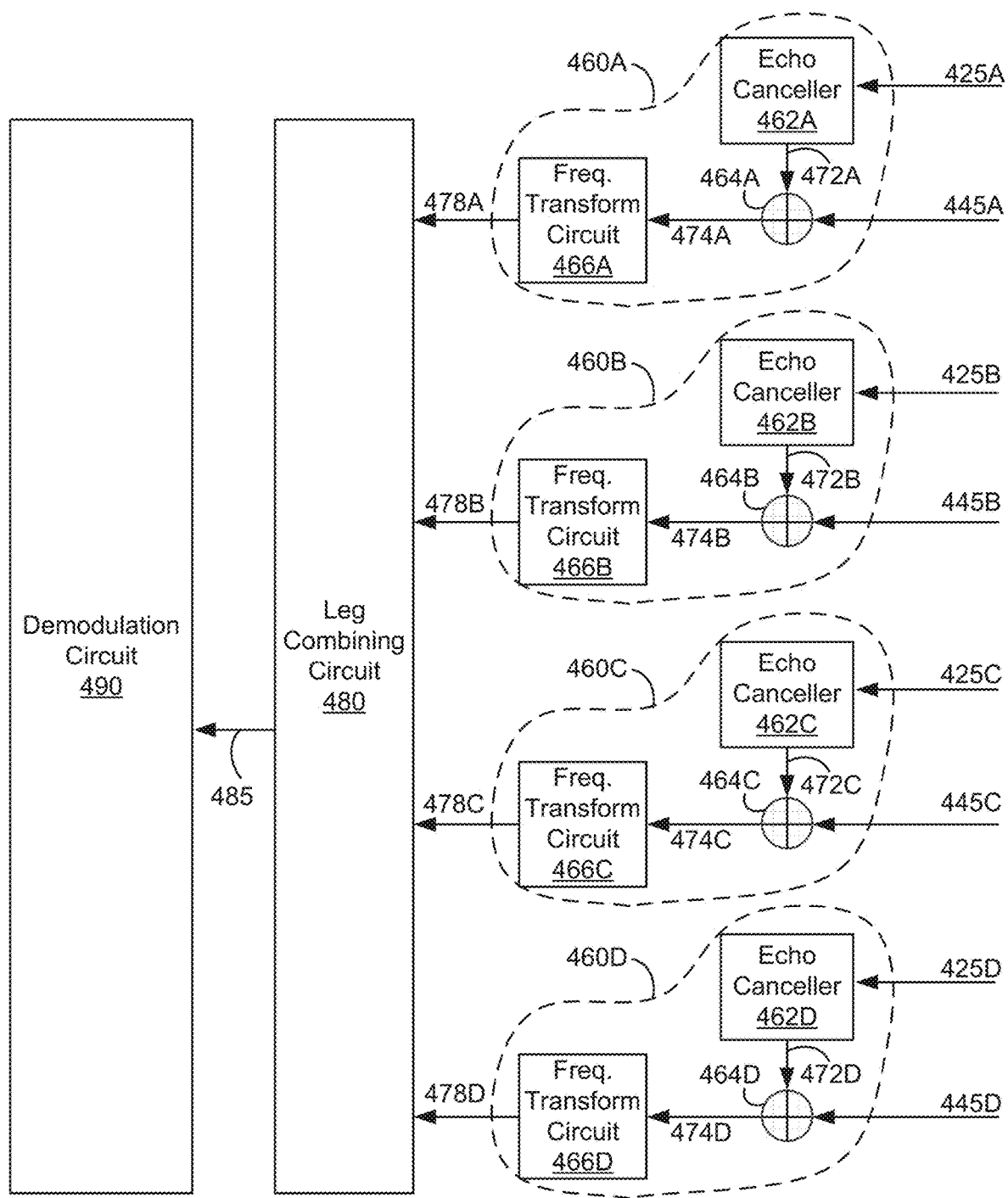
FIG. 4 is a block diagram depicting a node employing a leg combining circuit, according to one implementation.

Referring to FIG. 4, illustrated is a block diagram depicting a node employing a leg combining circuit 480, according to one implementation. In FIG. 4, a node includes a demodulation circuit 490, a leg combining circuit 480 and processing circuits 460A, 460B, 460C, 460D. The leg combining circuit 480 is coupled between the processing circuits 460 and the demodulation circuit 490. Each processing circuit 460 receives a downstream signal 425, for example, from a downstream transmitter and a receive signal 445, for example, from a front-end processing circuit associated with a corresponding leg. Each processing circuit 460 outputs a corresponding frequency transformed signal 478 with reduced reflections to the leg combining circuit 480.

A processing circuit 460 is a circuit that generates a frequency transformed signal 478 with reduced reflections. A frequency transformed signal 478 is a signal that represents an upstream signal from a network device in a frequency domain with reduced reflections due to a downstream signal from a downstream transmitter. In one configuration, a processing circuit 460 includes an echo canceller 462, an adder 464, and a frequency transformation circuit 466. The echo canceller 462 may correspond to the echo canceller 220 of FIG. 2 and the adder 464 may correspond to the adder 240 of FIG. 2. In this configuration, the echo canceller 462 receives a downstream signal 425 from a downstream transmitter, and applies modification on the downstream signal 425, for example, by multiplying the downstream signal 425 by coefficients of an adaptive filter to the downstream signal 425 to obtain a compensation signal 472. The compensation signal 472 is a signal that corresponds to reflections of the downstream signal 425 superimposed on the upstream signal with an inverted sign. The adder 464 receives the compensation signal 472 from the echo canceller 462 and the receive signal 445 from a front-end processing circuit, and removes or reduces the reflection by adding the compensation signal 472 to the receive signal 445. Hence, the adder 464 obtains a compensated signal 474 including an upstream signal with reduced or removed reflections. The frequency transformation circuit 466 performs a frequency transformation (e.g., FFT) on the compensated signal 474 in a time domain to obtain the frequency transformed signal 478 in a frequency domain. The frequency transformed signal 478 is output to the leg combining circuit 480.

The leg combining circuit 480 is a circuit that selects, per a subcarrier or a group of subcarriers, one of the frequency transformed signals 478A, 478B, 478C, 478D. The leg combining circuit 480 outputs a signal 485. The signal 485 may be a combination of subcarriers groups selected from the frequency transformed signals 478A, 478B, 478C, 478D. The leg combining circuit 480 transmits the signal 485 to the demodulation circuit 490. In one aspect, the leg combining circuit 480 operates under the principles described above with respect to FIG. 3B. Thus, noise from other legs may not degrade a signal to noise ratio at an input of the demodulation circuit 490. Additional description on implementations and operations of the leg combining circuit 480 are provided below with respect to FIGS. 5-7 and 11 below.

In some embodiments, the frequency transformation circuit 466 may be omitted, and the echo cancellation maybe performed in a frequency domain.

Figure 5:
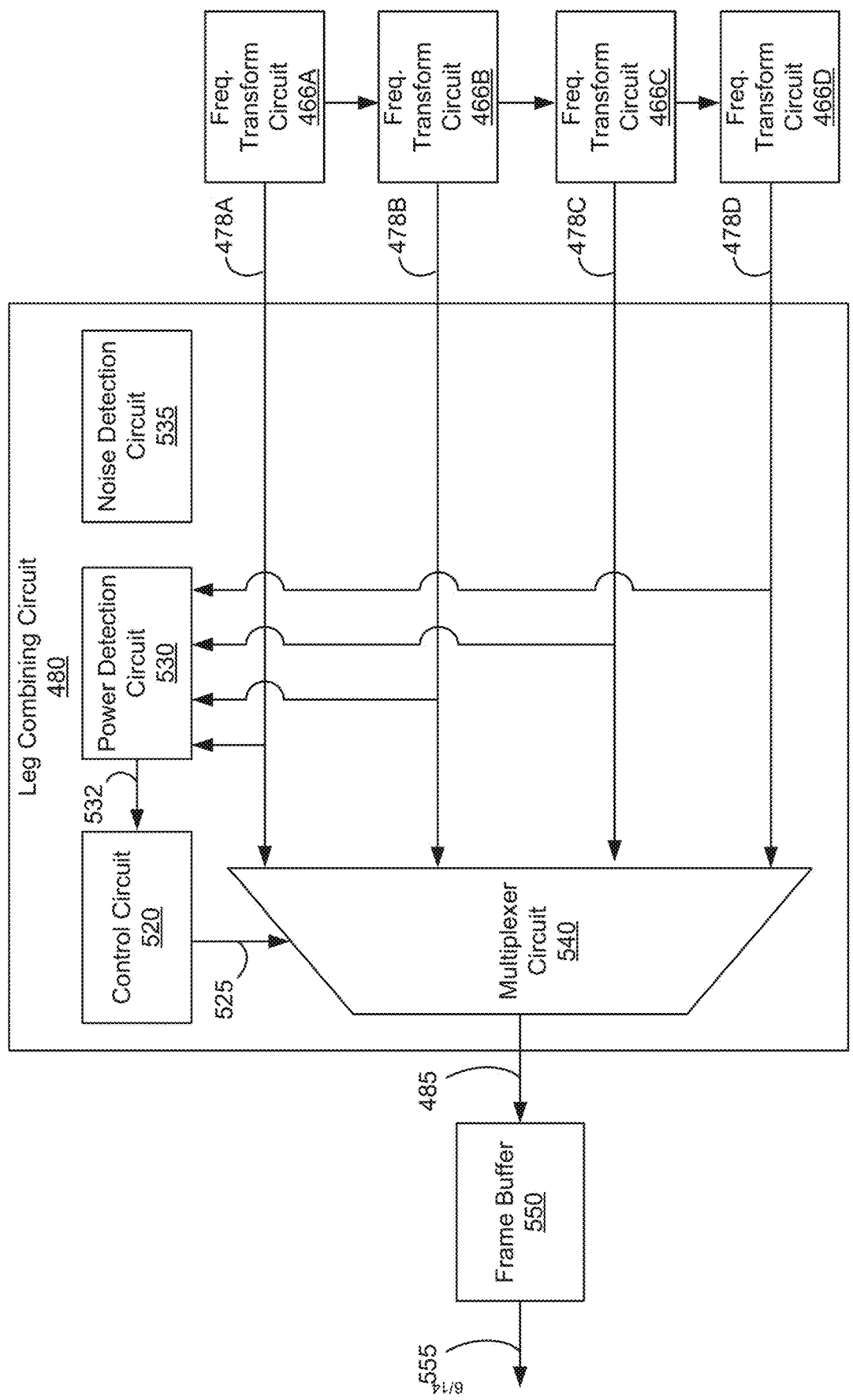
FIG. 5 is a block diagram depicting an example leg combining circuit, according to one implementation.

Referring to FIG. 5, illustrated is a block diagram depicting an example leg combining circuit 480, according to one implementation. In FIG. 5, the leg combining circuit 480 is coupled between an OFDMA frame buffer 550 and frequency transformation circuits 464A, 464B, 464C, 464D. In one embodiment, the leg combining circuit 480 includes a control circuit 520, a power detection circuit 530, a noise detection circuit 535, and a multiplexer circuit 540. These components operate together to select a signal from the frequency transformed signals 478A, 478B, 478C, 478D and to output the selected signal 485 to the frame buffer 550. The frame buffer 550 may be disposed between the leg combining circuit 480 and the demodulation circuit 490, or may be integrated with the leg combining circuit 480. The frame buffer 550 may receive the selected signal 485 from the leg combining circuit 480, and output the selected signal 555 per frame to the demodulation circuit 490. In other embodiments, the leg combining circuit 480 includes more, fewer, or different components than shown in FIG. 5.

The power detection circuit 530 is a circuit that determines power levels of a group of subcarriers of the frequency transformed signals 478A, 478B, 478C, 478D from the frequency transformation circuit 466A, 466B, 466C, 466D, respectively. The power detection circuit 530 may detect power levels of the frequency transformed signals 478A, 478B, 478C, 478D for corresponding frequency ranges. For example, the power detection circuit 530 detects a first power level of the first frequency transformed signal 478A at a first frequency range and detects a second power level of the second frequency transformed signal 478B at a second frequency range. The first frequency range and the second frequency range may be identical, separate from each other, or partially overlap with each other. A frequency range may be a group of non-consecutive or consecutive subcarriers. In DOCSIS3.1, for example, a group of subcarriers may be comprised of a single or several minislots for data transmissions, and any number of subcarriers in a probe symbol for probe transmissions. A minislot may have 8 subcarriers or 16 subcarriers with a symbol size of 20 us or 40 us, respectively. The symbol size may be configured per OFDMA channel.

In one configuration, the power detection circuit 530 has inputs coupled to outputs of the frequency transformation circuit 466A, 466B, 466C, 466D and an output coupled to the control circuit 520. In one aspect, the power detection circuit 530 determines, for each group of subcarriers (or each minislot) a signal having the highest power level from the frequency transformed signals 478A, 478B, 478C, 478D, and generates a power detection signal 532 indicating a frequency transformed signal 478 having the highest power level. In another aspect, the power detection circuit 530 determines, for each of the frequency transformed signals 478A, 478B, 478C, 478D, whether a power level of said each of the frequency transformed signals for a certain group of subcarriers exceeds a threshold level. In one approach, the power levels of the frequency transformed signals may be offset, according to noise present at respective legs. In another approach, the power detection circuit 530 may apply different threshold levels for different frequency transformed signals 478. In another approach, the power detection circuit 530 may apply different threshold levels for the same frequency transformed signals 478 for different groups of subcarriers. The threshold levels may be predetermined, or adaptively changed according to noise present in the leg. The power detection circuit 530 may generate a power detection signal 532 indicating one or more frequency transformed signals 478 above the respective threshold levels. The power detection circuit 530 provides the power detection signal 532 to the control circuit 520. For a certain minislot or a group of subcarriers, if there are two or more frequency transformed signals 478 that exceed the threshold, the power detection circuit 530 may determine one of the frequency transformed signals 478 or a leg associated with the selected one of the frequency transformed signals 478 that is less susceptible to noise (e.g. has a lower probability of noise events), and generate the power detection signal 532 indicating the determined frequency transformed signal for the certain minislot. The power detection circuit 530 may determine a probability of presence of noise for each leg based on a previous history of noise or based on a user input.

The noise detection circuit 535 is a circuit that detects noise (e.g., white noise, burst noise, etc.) from different frequency transformed signals 478A, 478B, 478C, 478D. The noise detection circuit 535 may monitor the frequency transformed signals 478A, 478B, 478C, 478D, continuously, periodically, or in response to receiving a request detect noise. The noise detection circuit 535 may determine a power level of a frequency transformed signal 478 as noise, when the transmitter and the network devices do not transmit a downstream signal and an upstream signal. The noise detection circuit 535 may determine the noise as threshold levels employed by the power detection circuit 530.

The control circuit 520 is a circuit that receives the power detection signal 532, and generates a control signal 525 according to the power detection signal 532. In one embodiment, the control circuit 520 is coupled between the power detection circuit 530 and the multiplexer circuit 540. In this configuration, the control circuit 520 generates the control signal 525 indicating a selected frequency transformation circuit 466 outputting the frequency transformed signal 478 having the highest power level and/or above a threshold level as indicated by the power detection signal 532. In some embodiments, the control circuit 520 outputs the control signal 525 to select a frequency transformation circuit 466 at its corresponding time period.

The multiplexer circuit 540 is a circuit that outputs the selected signal 485 to the frame buffer 550. In one configuration, the multiplexer circuit 540 includes inputs coupled to the frequency transformation circuit 466A, 466B, 466C, 466D, a control port coupled to the control circuit 520, and one or more outputs coupled to the frame buffer 550. In this configuration, the multiplexer circuit 540 allows one or more of the frequency transformed signals 478A, 478B, 478C, 478D to be output to the frame buffer 550 as the selected signal 485, according to the control signal 525. Specifically, the multiplexer circuit 540 couples the frame buffer 550 to the frequency transformation circuit 466 generating the selected signal 485, according to the control signal 525.

Figure 6:
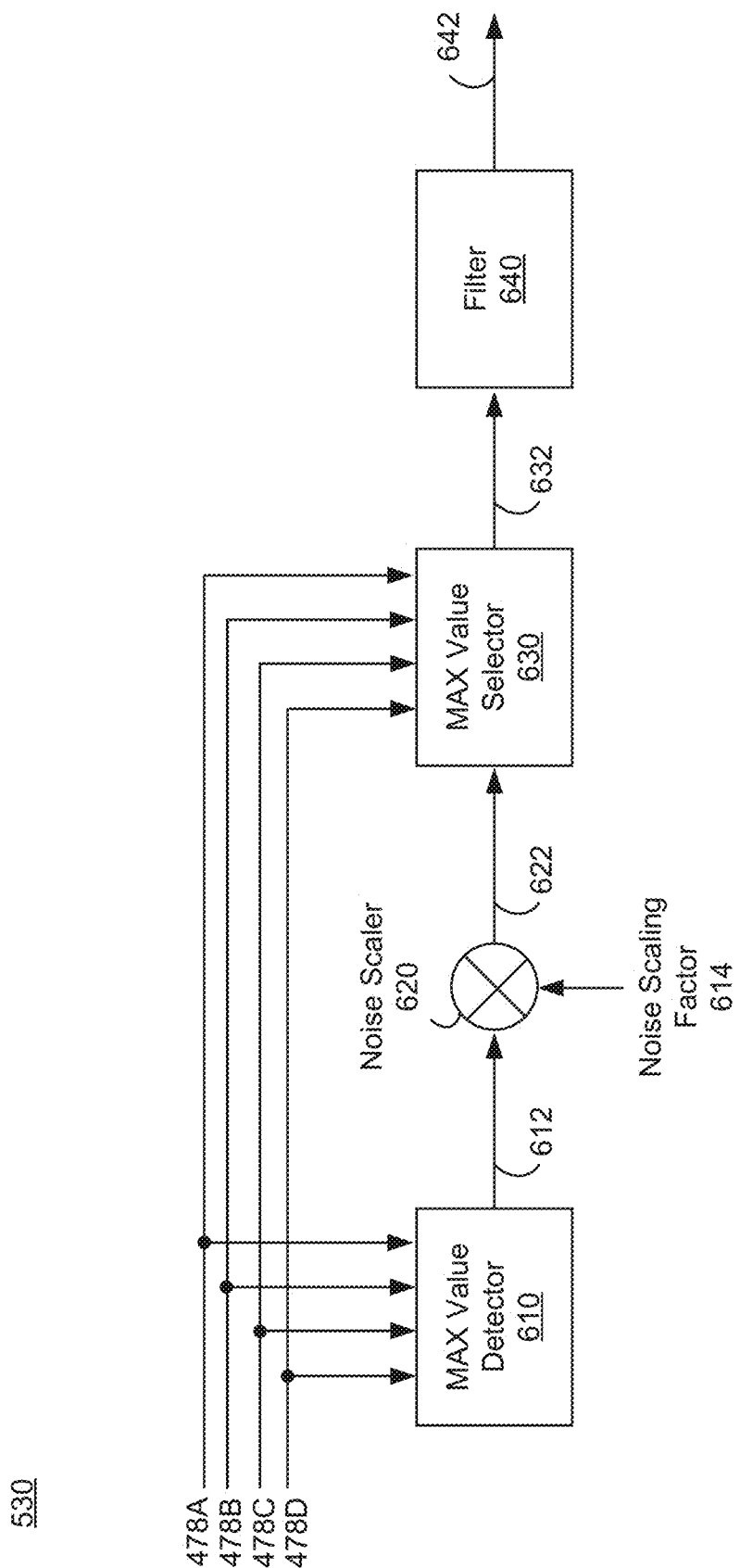
FIG. 6 is a block diagram depicting an example power detection circuit of the leg combining circuit in FIG. 5, according to one implementation.

Referring to FIG. 6, illustrated is a block diagram depicting an example power detection circuit 530 of the leg combining circuit 480 in FIG. 5, according to one implementation. In one embodiment, the power detection circuit 530 includes a max value detector 610, a noise scaler 620, a max value selector 630, and a filter 640. These components operate together to detect power levels of the frequency transformed signals 478A, 478B, 478C, 478D, and select a frequency transformed signal having the highest power level, one or more frequency transformed signals having power levels above threshold levels, or a combination of them. In other embodiments, the power detection circuit 530 includes more, fewer, or different components than shown in FIG. 6.

The max value detector 610 is a circuit that detects a signal from the frequency transformed signals 478 having one or multiple signals having power levels higher than a pre-configured threshold power level. The power levels may be calculated per an OFDMA symbol duration. The max value detector 610 forwards the selected signal 612 to the noise scaler 620. The noise scaler 620 receives the selected signal 612, and multiplies the selected signal 612 by a noise scaling factor 614 to obtain the scaled signal 622. The noise scaling factor 614 may correspond to a threshold level determined by the noise detection circuit 535, and takes into account the probability of noise occurring on each leg. The max value selector 630 receives the scaled signal 622, and determines whether any of the frequency transformed signals 478A, 478B, 478C, 478D is larger than the scaled signal 622. If any of the frequency transformed signals 478A, 478B, 478C, 478D is larger than the scaled signal 622, the max value selector 630 outputs the frequency transformed signal 478 exceeding the threshold level as the signal 632. Burst noise may be filtered from signal 632 by the filter 640. The filtered signal 642 corresponds to the power detection signal 532 indicating a frequency transformed signal 478 having the highest power level. In this configuration, for a certain minislot or a group of subcarriers, a leg or a frequency transformed signal 478 that is less susceptible to noise can be scaled according to the noise scaling factor 614.

Hence, if there are two or more frequency transformed signals 478 that exceed the threshold, the max value selector 630 may select, for the certain minislot or the group of subcarriers, the frequency transformed signal 478 that is less susceptible to noise. Accordingly, a burst noise or an impulse noise from a certain channel may not be selected.

In some embodiments, the implementation and operation of the power detection circuit 530 is the same or similar to the one described in U.S. Pat. No. 9,548,836 filed Jan. 17, 2017 and titled "Upstream Burst Noise Detection," which is incorporated by reference herein.

Figure 7:
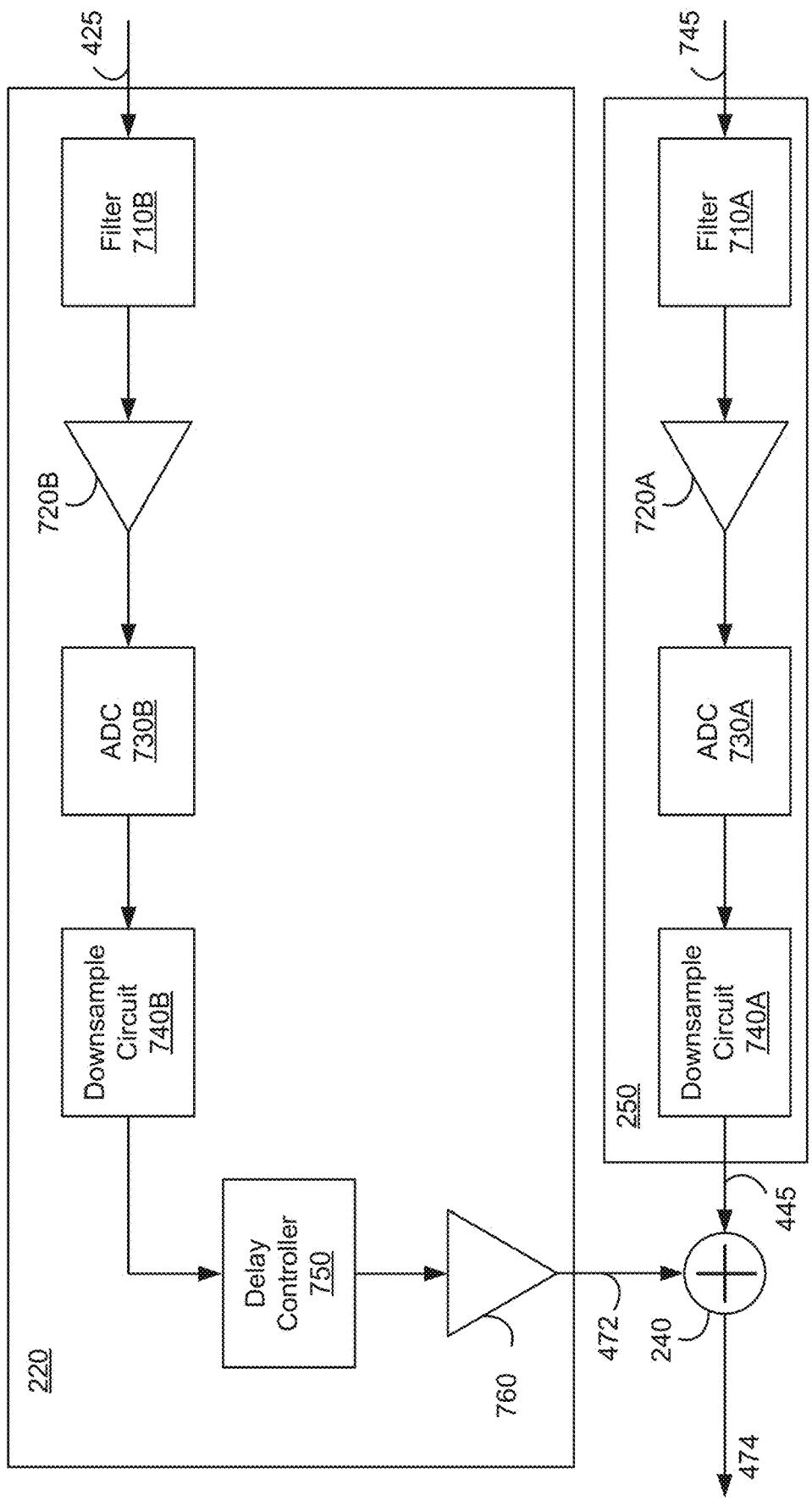
FIG. 7 is a block diagram depicting an example echo canceller and an example front-end processing circuit, according to one implementation.

Referring to FIG. 7, illustrated is a block diagram depicting an example echo canceller 220 and an example front-end processing circuit 250, according to one implementation. In one aspect, the front-end processing circuit 250 receives an input signal 745 from the network device through a coupler, and outputs a receive signal 445 to the adder 240. The echo canceller 220 receives the downstream signal 425 and mimics the front-end processing circuit 250 to generate the compensation signal 472 corresponding to reflections of a downstream signal 425 superimposed on an upstream signal with an inverted sign. The adder 240 adds the compensation signal 472 to the receive signal 445 to remove a portion of the receive signal 445 corresponding to the reflections due to the downstream signal 425. Accordingly, the compensated signal 474 output from the adder 240 may substantially represent the upstream signal output by the network device with reduced reflections.

In one embodiment, the front-end processing circuit 250 includes a filter 710A, an amplifier 720A, an analog-to-digital converter 730A, and a downsample circuit 740A that are coupled to each other in series. These components operate together to receive the input signal 745 including an upstream signal and reflections in an analog format, and performs processing such as amplification, filtering, analog-to-digital conversion, downsampling, etc. to generate the receive signal 445 in a digital format. In other embodiments, the front-end processing circuit 250 includes more, fewer, or different components than shown in FIG. 7. For example, some components may be arranged in a different sequence than shown in FIG. 7.

In one embodiment, the echo canceller 220 includes a filter 710B, an amplifier 720B, an analog-to-digital converter 730B, a downsample circuit 740B, an adaptive filter 750, and an inverter 760. The filter 710B, amplifier 720B, the analog-to-digital converter 730B, the downsample circuit 740B may be similar to the ones in the front-end processing circuit 250, and may incorporate the same features and functionality discussed above. The echo canceller 220 includes the adaptive filter 750, such that the output signal 474 power is minimized. The inverter 760 multiplies the output of the adaptive filter 750 by a negative value, such that an amplitude of the portion of the receive signal 445 corresponding to the reflection and an amplitude of the compensation signal 472 are matched with an inverted sign. The adaptive filter 750 may be an LMS adaptive filter.

Figure 8:
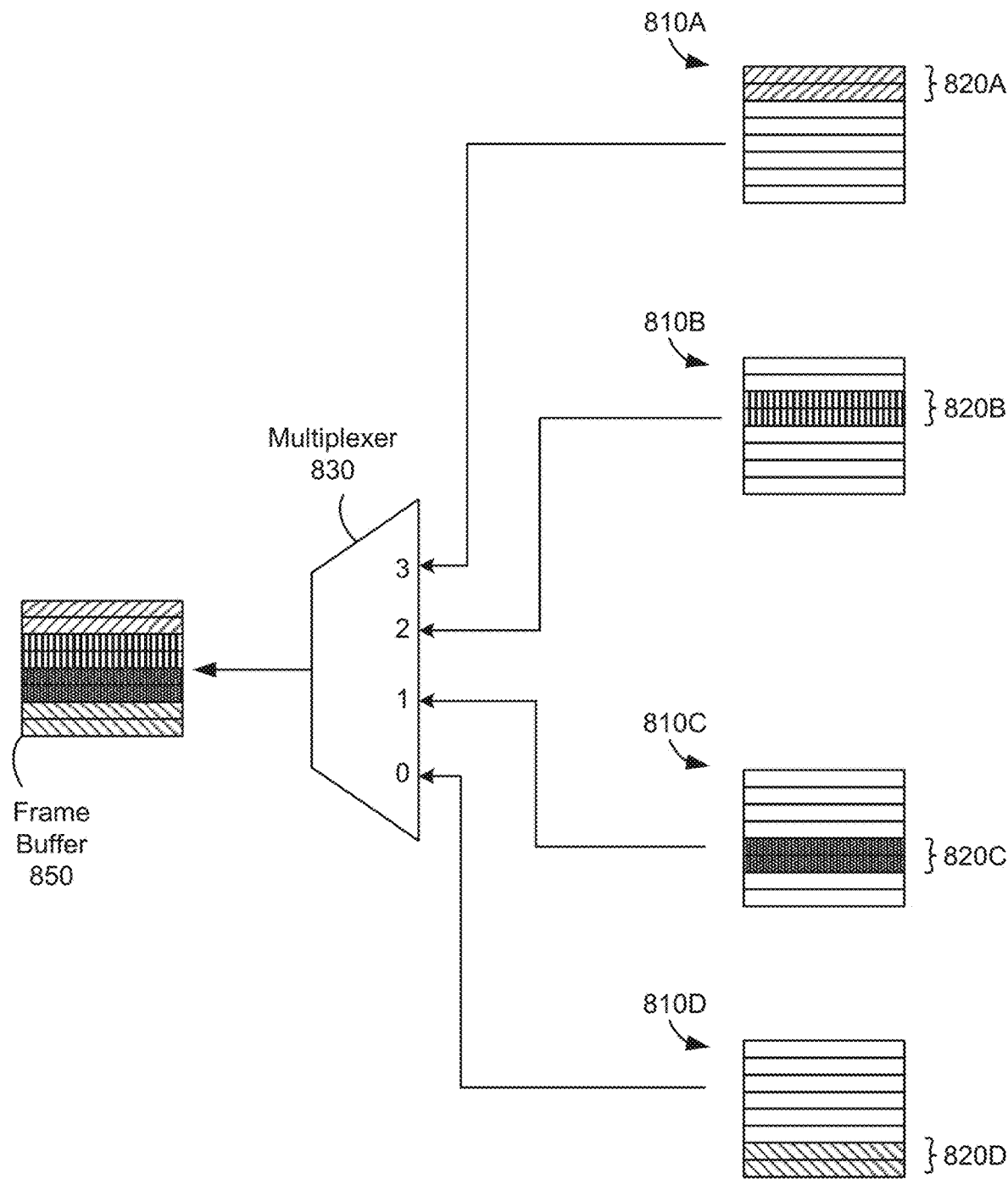
FIG. 8 is a block diagram depicting combining signals through different legs into a single channel, according to one implementation.

Referring to FIG. 8, illustrated is a block diagram depicting combining signals through different legs for a single channel, according to one implementation. In one implementation, outputs 810A, 810B, 810C, 810D, of four frequency transformation circuits are combined into a single channel. Four legs may output synchronized OFDMA symbols conforming to DOCSIS 3.1 standard. A multiplexer 830 receives outputs 810A, 810B, 810C, 810D from four transformation circuits, and selects outputs 810x1 to the frame buffer 950A at corresponding time periods. For example, the frame buffer 850 receives a first portion of the output 810A corresponding to a first group of subcarriers 820A (e.g., minislot) during a first time period, and a second portion of the output 810B corresponding to a second group of subcarriers 820B (e.g., minislot) during a second time period. Stored data by the frame buffer 850 may be provided to the demodulation circuit for subsequent decoding or demodulation.

Figure 9:
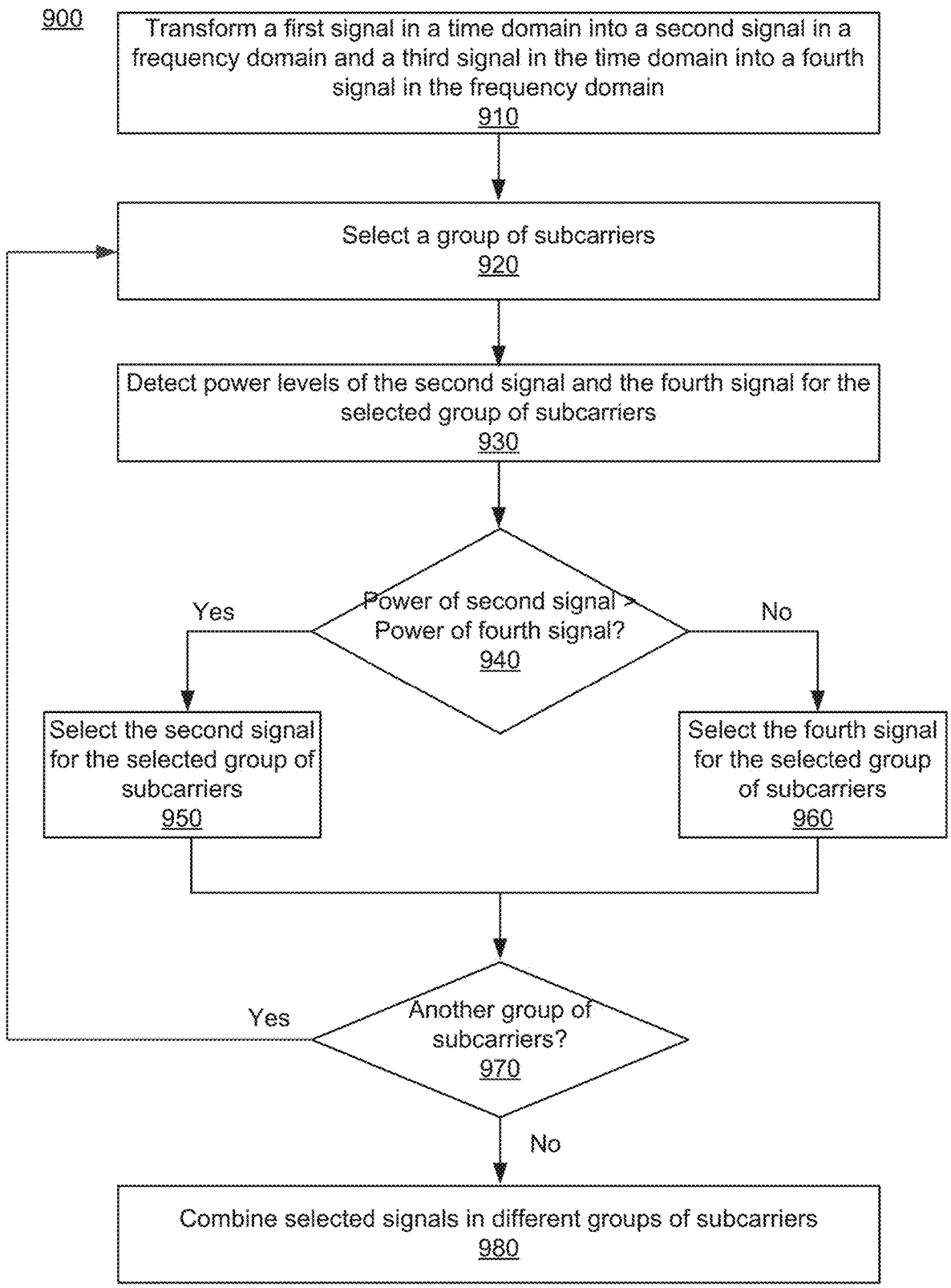
FIG. 9 is a flow chart depicting a process of performing a frequency transformation selection of signals received through different legs, according to one implementation.

Referring to FIG. 9, illustrated is a flow chart depicting a process 900 of performing a frequency transformation selection of signals received through different legs, according to one implementation. The process 900 may be performed by a node including the leg combining circuit 480 of FIG. 4. The process 900 may include more, fewer, or different steps than shown in FIG. 10.

The node transforms 910 a first signal in a time domain into a corresponding second signal in a frequency domain, and a third signal in the time domain into a corresponding fourth signal in the frequency domain. The first signal may be an upstream signal from a network device (e.g., a router, a switch, a modem, etc.) received through a first leg, and the third signal may be an upstream signal from another network device received through a second leg. In one approach, the node includes a first frequency transformation circuit that performs FFT on the first signal in the time domain to obtain the second signal in the frequency domain. Moreover, the node includes a second frequency transformation circuit that performs FFT on the third signal in the time domain to obtain the fourth signal in the frequency domain.

The node selects 920 a group of subcarriers (or a minislot). The group of subcarriers may be selected at a corresponding time period. The node detects 930 a first power level of the second signal for the selected group of subcarriers (or a minislot), and a second power level of the fourth signal for the group of subcarriers (or the minislot).

The node compares 940 the first power level and the second power level for the group of sub carriers, and determines whether the first power level is larger than the second power level. If the first power level is larger than the second power level, then the node selects 950 the second signal. If the first power level is less than the second power level, then the node selects 960 the fourth signal.

In some embodiments, the node selects the signal based on threshold values. For example, the node determines whether the first power level and the second power level are above threshold values. The threshold values may be predetermined or adaptively adjusted. The first power level of the third signal and the second power level of the fourth signal may have same or different threshold values. The threshold values may be determined according to noise present at the leg. For a certain minislot or a group of subcarriers, if both the second signal and the fourth signal exceed the threshold, the node may determine one of the second signal and the fourth signal that is less susceptible to noise, and select the determined signal for the certain minislot.

The node determines 970 whether another group of subcarriers exists or not. For example, the node determines whether another group of subcarriers of an OFDMA symbol exists or not. If another group of subcarriers is available, the node returns to step 920 to select another group of subcarriers and repeats the process until no additional group of subcarriers of an OFDMA symbol is available.

The node combines 980 the selected signals in different groups of subcarriers to form a frame buffer, for example, for an OFDMA symbol. The frame buffer may be provided to a demodulation circuit 490, by which the selected signal may be decoded or demodulated. In one aspect, the node may cause a frequency transformation circuit generating the selected signal to be provided to demodulation circuit 490 directly. For example, the node includes the multiplexer circuit 540 that couples the demodulation circuit 490 to the frequency transformation circuit generating the selected signal at a corresponding time period, according to the power level detected by the power detection circuit 530 for the selected group of subcarriers.

Although the process 900 is described with two signals from two frequency transformation circuits, different number of signals (e.g., four or more) from different number of frequency transformation circuit may be combined in a similar manner as described above.

Figure 10:
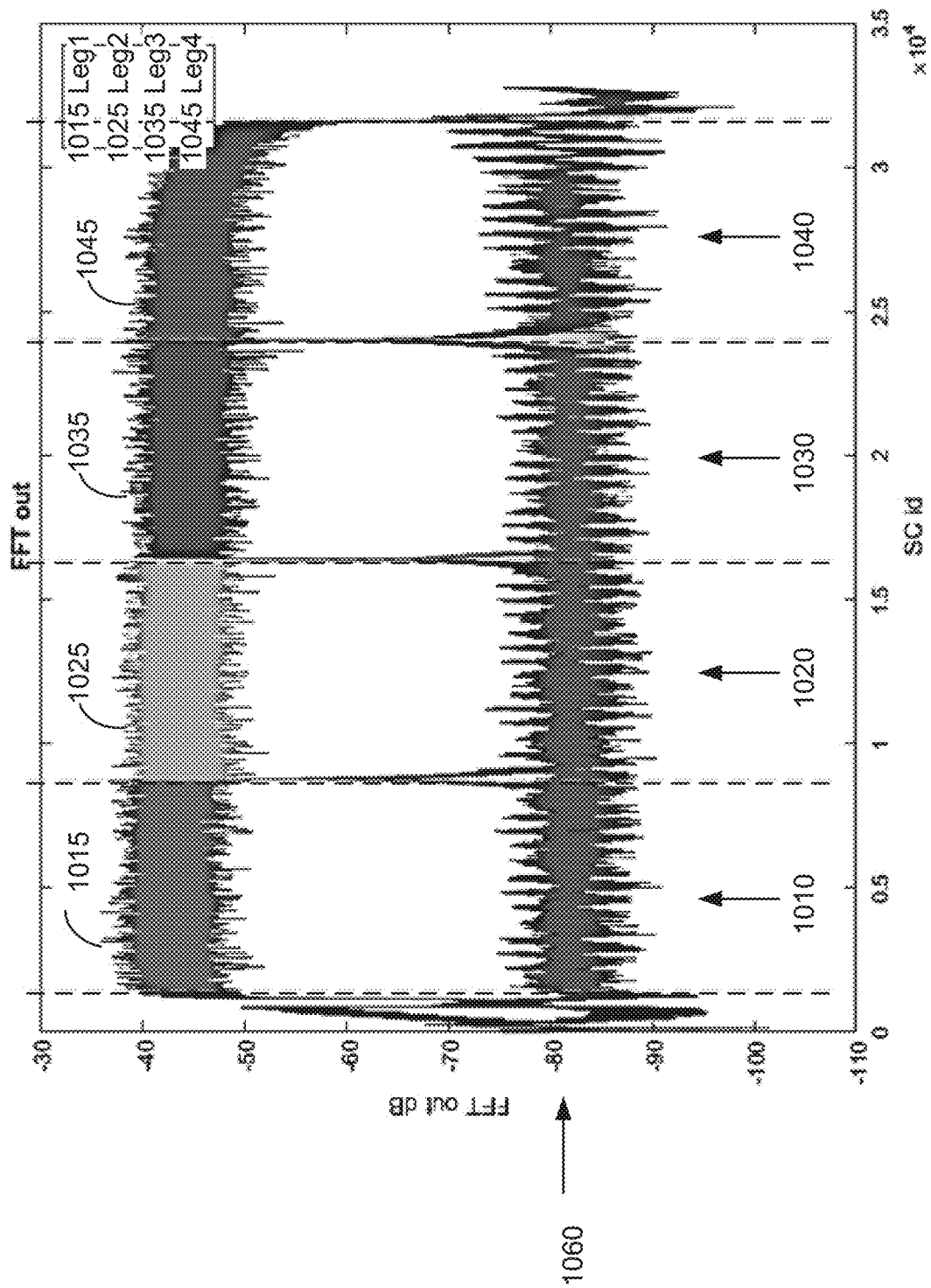
FIG. 10 shows plots illustrating frequency transformed signals of different legs, according to one implementation.

Referring to FIG. 10, illustrated are frequency transformed signals of different legs, according to one implementation. A first leg outputs a signal 1015 in groups of subcarriers 1010, 1020, 1030, 1040. A portion of the signal 1015 in a first group of subcarriers 1010 contains a first portion of OFDMA symbol. Other portions of the signal 1015 may be noise 1060. Similarly, a second leg outputs a signal 1025 in groups of subcarriers 1010, 1020, 1030, 1040. A portion of the signal 1025 in a second group of subcarriers 1020 contains a second portion of the OFDMA symbol. Other portions of the signal 1025 may be noise 1060. Similarly, a third leg outputs a signal 1035 in groups of subcarriers 1010, 1020, 1030, 1040. A portion of the signal 1035 in a third group of subcarriers 1030 contains a third portion of the OFDMA symbol. Other portions of the signal 1035 may be noise 1060. Moreover, a fourth leg outputs a signal 1045 in groups of subcarriers 1010, 1020, 1030, 1040. A portion of the signal 1045 in a fourth group of subcarriers 1040 contains a fourth portion of the OFDMA symbol. Other portions of the signal 1045 may be noise 1060. The leg combining circuit 480 disclosed herein may combine signals in different groups of subcarriers to output an OFDMA symbol. Advantageously, by implementing the disclosed leg combining circuit 480, a signal to noise ratio may improve by 6 to 7 dB compare to not implementing the leg combining circuit.

Although various embodiments disclosed herein are described with respect to OFDMA, general principles disclosed herein may be applied to other frequency divisional multiple access schemes or other modulation schemes.

Accordingly, the systems and methods discussed herein provide for improved signal to noise ratios of signals from multiple communication links. In a first aspect, the present disclosure is directed to a system for performing frequency transformation selection to improve signal to noise ratios in multiple communication links. In one or more embodiments, the system includes a first frequency transformation circuit configured to transform a first signal in a time domain received from a first device into a corresponding second signal in a frequency domain. The system further includes a second frequency transformation circuit configured to transform a third signal in the time domain received from a second device into a corresponding fourth signal in the frequency domain. The system further includes a leg combining circuit coupled to the first frequency transformation circuit and the second frequency transformation circuit. The leg combining circuit is configured to select, for a group of subcarriers, one of the first frequency transformation circuit and the second frequency transformation circuit. The leg combining circuit is further configured to cause, for the group of subcarriers, the selected one of the first frequency transformation circuit and the second frequency transformation circuit to output one of the second signal and the fourth signal, according to the selection.

In one or more embodiments, the group of subcarriers is selected from groups of subcarriers of orthogonal frequency division multiple access (OFDMA) symbols or orthogonal frequency division multiplexing (OFDM) symbols.

In one or more embodiments, the leg combining circuit includes a power detection circuit coupled to the first frequency transformation circuit and the second frequency transformation circuit. The power detection circuit may be configured to detect, for the group of subcarriers, a first power level of the second signal and a second power level of the fourth signal. In one or more embodiments, the leg combining circuit further includes a control circuit coupled to the first frequency transformation circuit, the second frequency transformation circuit, and the power detection circuit. The control circuit may be configured to compare the first power level and the second power level, and select, for the group of subcarriers, the one of the first frequency transformation circuit and the second frequency transformation circuit associated with a higher power level of the first power level and the second power level according to the comparison.

In one or more embodiments, the control circuit offsets the first power level according to a first noise associated with a first connection between the first device and the first frequency transformation circuit, and offsets the second power level according to a second noise associated with a second connection between the second device and the second frequency transformation circuit.

In one or more embodiments, the leg combining circuit further includes a noise detection circuit coupled to the first connection and the second connection. The noise detection circuit may be configured to detect the first noise during a first time period and a second noise during a second time period.

In one or more embodiments, the leg combining circuit includes a control circuit coupled to the first frequency transformation circuit and the second frequency transformation circuit. The control circuit may be configured to select the second signal to be output during a first time period associated with the first device, and select the fourth signal to be output during a second time period associated with the second device.

In one or more embodiments, the system further includes an echo cancellation circuit (i) coupled between the first frequency transformation circuit and a transmitter circuit, and (ii) coupled between the first frequency transformation circuit and the first device. The transmitter circuit may be configured to transmit a downstream signal to the first device. The echo cancellation circuit may be configured to reduce a reflection of the downstream signal superimposed on an upstream signal, transmitted by the first device to the system, to obtain the first signal.

In one or more embodiments, the echo cancellation circuit is further configured to predict the reflection of the downstream signal superimposed on the upstream signal, and subtract the predicted reflection of the downstream signal from the upstream signal to obtain the first signal.

In one or more embodiments, the system further includes a frequency demodulation circuit coupled to the leg combining circuit. The frequency demodulation circuit may be configured to receive the one of the second signal and the fourth signal from the leg combining circuit, and demodulate the one of the second signal and the fourth signal.

In one or more embodiments, the system further includes a frame buffer coupled to the leg combining circuit. The leg combining circuit may be configured to cause, during a first time period, the selected one of the first frequency transformation circuit and the second frequency transformation circuit to output a first portion of the one of the second signal and the fourth signal to the frame buffer for the group of subcarriers. The leg combining circuit may be configured to cause, during a second time period, the other of the first frequency transformation circuit and the second frequency transformation circuit to output a first portion of the other of the second signal and the fourth signal to the frame buffer for another group of subcarriers.

In a second aspect, the present disclosure is directed to a method for performing frequency transformation selection to improve signal to noise ratios in multiple communication links. In one or more embodiments, the method includes transforming a first signal in a time domain from a first device into a corresponding second signal in a frequency domain. The method further includes transforming a third signal in the time domain from a second device into a corresponding fourth signal in the frequency domain. The method further includes selecting, for a group of subcarriers, one of the second signal and the fourth signal. The method further includes outputting, for the group of subcarriers, the selected one of the second signal and the fourth signal.

In one or more embodiments, the group of subcarriers is selected from groups of subcarriers of orthogonal frequency division multiple access (OFDMA) symbols or orthogonal frequency division multiplexing (OFDM) symbols.

In one or more embodiments, selecting the one of the second signal and the fourth signal further includes detecting, for the group of subcarriers, a first power level of the second signal and a second power level of the fourth signal, comparing the first power level and the second power level, and selecting the one of the second signal and the fourth signal according to the comparison.

In one or more embodiments, selecting the one of the second signal and the fourth signal further includes offsetting the first power level according to a first noise associated with a first connection between the first device and a system, and offsetting the second power level according to a second noise associated with a second connection between the second device and the system.

In one or more embodiments, selecting the one of the second signal and the fourth signal further includes selecting the second signal to be output during a first time period associated with the first device, and selecting the fourth signal to be output during a second time period associated with the second device.

In one or more embodiments, the method further includes predicting a reflection of a downstream signal superimposed on an upstream signal. The downstream signal may be transmitted by a system to the first device. The upstream signal may be transmitted by the first device to the system. The method further includes subtracting the predicted reflection of the downstream signal from the upstream signal to obtain the first signal.

In one or more embodiments, the method further includes combining a portion of the one of the second signal and the fourth signal received during a first time period for the group of subcarriers, and another portion of the other of the second signal and the fourth signal received during a second time period for another group of subcarriers.

In a third aspect, the present disclosure is directed to a system for performing frequency transformation selection to improve signal to noise ratios in multiple communication links. In one or more embodiments, the system includes a first frequency transformation circuit configured to transform a first signal in a time domain received from a first device into a corresponding second signal in a frequency domain. The system further includes a second frequency transformation circuit configured to transform a third signal in the time domain received from a second device into a corresponding fourth signal in the frequency domain. The system further includes a leg combining circuit coupled to the first frequency transformation circuit and the second frequency transformation circuit. The leg combining circuit is configured to detect power levels of the second signal and the fourth signal for a first group of subcarriers of orthogonal frequency division multiple access (OFDMA) or orthogonal frequency division multiplexing (OFDM) symbols, and output one of the second signal and the fourth signal for the first group of subcarriers according to the detected power level.

In one or more embodiments, the leg combining circuit is configured to detect the power levels of the second signal and the fourth signal for the first group of subcarriers during a first time period; detect the power levels of the second signal and the fourth signal for a second group of subcarriers during the first time period; output the one of the second signal and the fourth signal for the first group of subcarriers during the first time period; and output the other of the second signal and the fourth signal for the second group of subcarriers during the first time period.

In one or more embodiments, the system includes a frame buffer coupled to the leg combining circuit. The frame buffer may be configured to combine the one of the second signal and the fourth signal for the first group of subcarriers and the other of the second signal and the fourth signal for the second group of subcarriers.

B. Computing and Network Environment

Having discussed specific embodiments of the present solution, it may be helpful to describe aspects of the operating environment as well as associated system components (e.g., hardware elements) in connection with the methods and systems described herein. Referring to FIG. 11A, an embodiment of a network environment is depicted. In brief overview, the network environment includes a communication system that includes one or more network devices 1106, one or more communication devices 1102 and a fiber node 1192. The one or more network devices 1106 may be the network device 160 in FIG. 1, the fiber node 1192 may be the node 110 in FIG. 1, and the one or more communication devices 1102 may be computing devices. The communication devices 1102 may for example include laptop computers 1102, tablets 1102, personal computers 1102 and/or cellular telephone devices 1102. The details of an embodiment of each communication device and/or network device are described in greater detail with reference to FIGS. 11B and 11C. The network environment can be an ad hoc network environment, an infrastructure network environment, a sub-net environment, etc.

The network devices 1106 may be operably coupled to the fiber node 1192 via local area network connections. The fiber node 1192, which may include a router, gateway, switch, bridge, modem, system controller, appliance, etc., may provide a local area network connection for the communication system. Each of the network devices 1106 may have an associated antenna or an antenna array to communicate with the communication devices 1102 in its area. The communication devices 1102 may register with a particular network device 1106 to receive services from the communication system (e.g., via a SU-MIMO or MU-MIMO configuration). For direct connections (e.g., point-to-point communications), some communication devices 1102 may communicate directly via an allocated channel and communications protocol. Some of the communication devices 1102 may be mobile or relatively static with respect to the network device 1106.

In some embodiments a network device 1106 includes a device or module (including a combination of hardware and software) that allows communication devices 1102 to connect to a wired network using Wi-Fi, or other standards. A network device 1106 may be configured, designed, and/or built for operating in a wireless local area network (WLAN). A network device 1106 may connect to a router (e.g., via a wired network) as a standalone device in some embodiments. In other embodiments, a network device can be a component of a router. A network device 1106 can provide multiple devices 1102 access to a network. A network device 1106 may, for example, connect to the devices 1102 through a wired Ethernet connection, a wireless Wi-Fi connection, or both. A network device 1106 may be built and/or configured to support a standard for sending and receiving data using one or more radio frequencies. Those standards, and the frequencies they use may be defined by the IEEE (e.g., IEEE 802.11 standards). A network device may be configured and/or used to support public Internet hotspots, and/or on an internal network to extend the network's Wi-Fi signal range.

In some embodiments, the network devices 1106 may be used for (e.g., in-home or in-building) wireless networks (e.g., IEEE 802.11, Bluetooth, ZigBee, any other type of radio frequency based network protocol and/or variations thereof). Each of the communication devices 1102 may include a built-in radio and/or is coupled to a radio. Such communication devices 1102 and/or network devices 1106 may operate in accordance with the various aspects of the disclosure as presented herein to enhance performance, reduce costs and/or size, and/or enhance broadband applications. Each communication devices 1102 may have the capacity to function as a client node seeking access to resources (e.g., data, and connection to networked nodes such as servers) via one or more network devices 1106.

The network connections may include any type and/or form of network and may include any of the following: a point-to-point network, a broadcast network, a telecommunications network, a data communication network, and a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

The fiber node 1192, the communications device(s) 1102 and network device(s) 1106 may be deployed as and/or executed on any type and form of computing device, such as a computer, network device or appliance capable of communicating on any type and form of network and performing the operations described herein. FIGS. 11B and 11C depict block diagrams of a computing device 1100 useful for practicing an embodiment of the fiber node 1192, the communication devices 1102 or the network device 1106. As shown in FIGS. 11B and 11C, each computing device 1100 includes a central processing unit 1121, and a main memory unit 1122. As shown in FIG. 11B, a computing device 1100 may include a storage device 1128, an installation device 1116, a network interface 1118, an I/O controller 1123, display devices 1124a-1124n, a keyboard 1126 and a pointing device 1127, such as a mouse. The storage device 1128 may include, without limitation, an operating system and/or software. As shown in FIG. 11C, each computing device

1100 may also include additional optional elements, such as a memory port 1103, a bridge 1170, one or more input/output devices 1130a-1130n (generally referred to using reference numeral 1130), and a cache memory 1140 in communication with the central processing unit 1121.

The central processing unit 1121 is any logic circuitry that responds to and processes instructions fetched from the main memory unit 1122. In many embodiments, the central processing unit 1121 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 1100 may be based on any of these processors, or any other processor capable of operating as described herein.

Main memory unit 1122 may be one or more memory chips capable of storing data and allowing any storage location to be directly accessed by the microprocessor 1121, such as any type or variant of Static random access memory (SRAM), Dynamic random access memory (DRAM), Ferroelectric RAM (FRAM), NAND Flash, NOR Flash and Solid State Drives (SSD). The main memory 1122 may be based on any of the above described memory chips, or any other available memory chips capable of operating as described herein. In the embodiment shown in FIG. 11B, the processor 1121 communicates with main memory 1122 via a system bus 1150 (described in more detail below). FIG. 11C depicts an embodiment of a computing device 1100 in which the processor communicates directly with main memory 1122 via a memory port 1103. For example, in FIG. 11C the main memory 1122 may be DRDRAM.

Figure 11B:
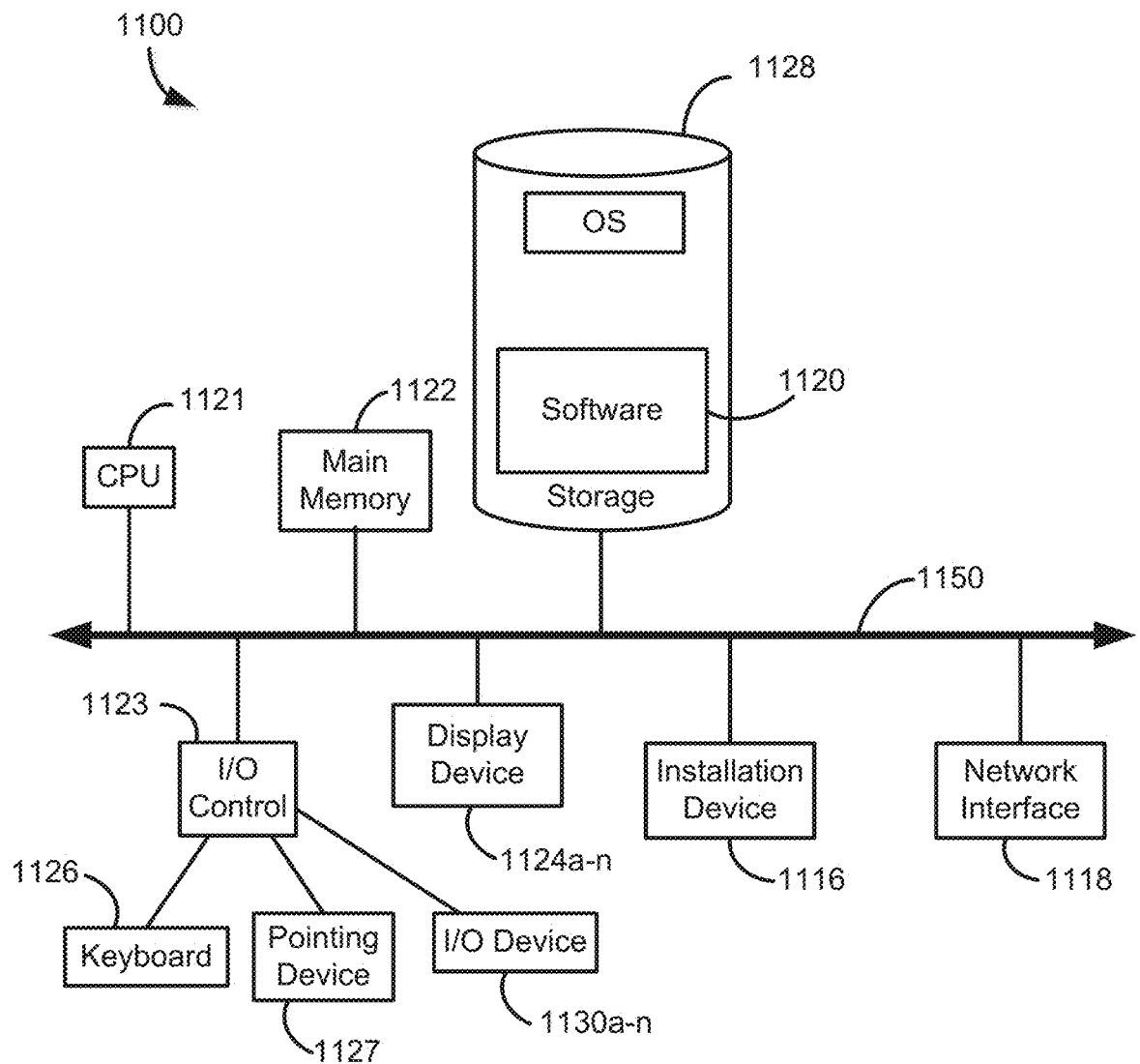
FIGS. 11B and 11C are block diagrams depicting embodiments of computing devices useful in connection with the methods and systems described herein.
Figure 11C:
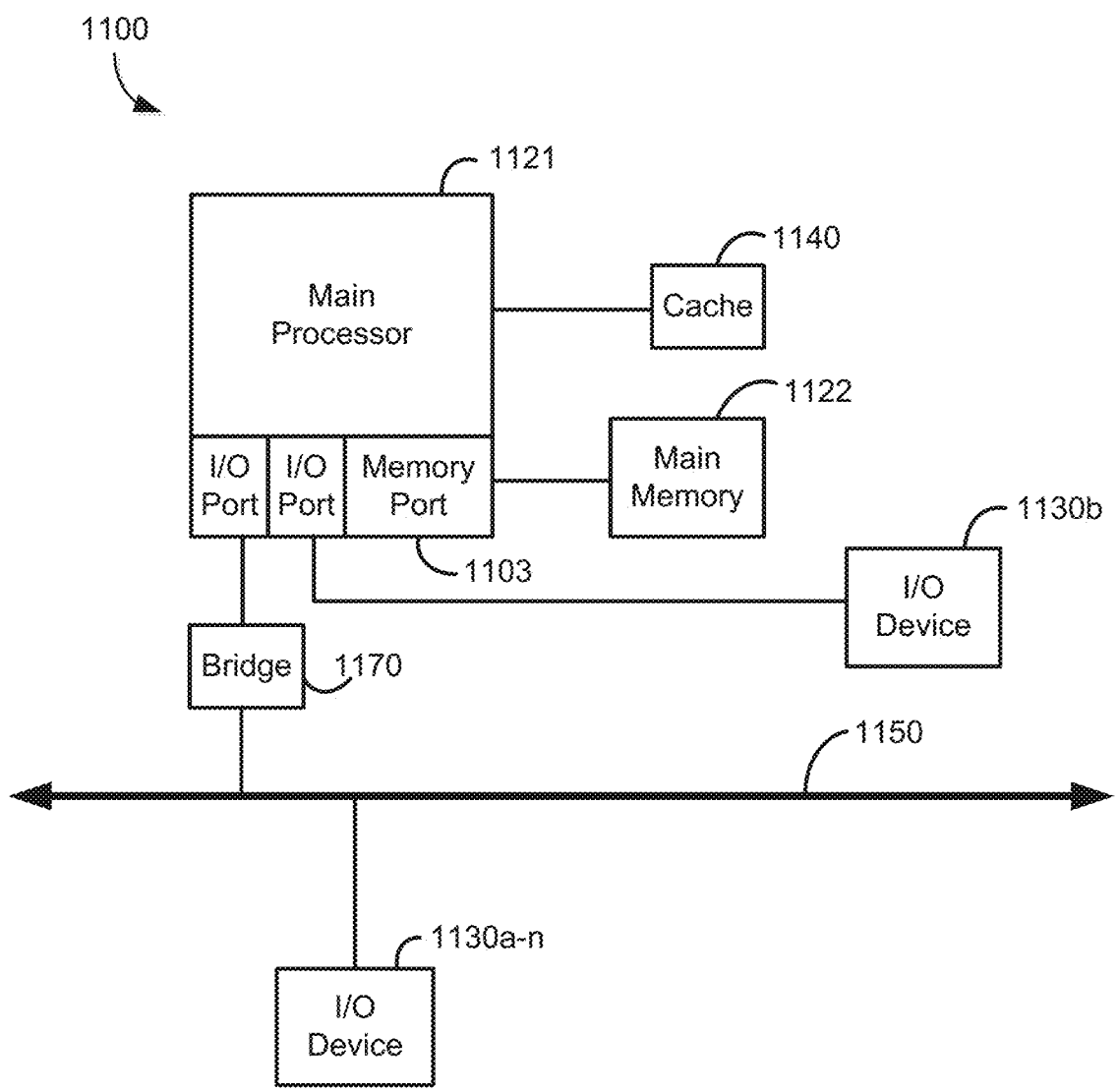

FIG. 11C depicts an embodiment in which the main processor 1121 communicates directly with cache memory 1140 via a secondary bus, sometimes referred to as a backside bus. In other embodiments, the main processor 1121 communicates with cache memory 1140 using the system bus 1150. Cache memory 1140 typically has a faster response time than main memory 1122 and is provided by, for example, SRAM, BSRAM, or EDRAM. In the embodiment shown in FIG. 11C, the processor 1121 communicates with various I/O devices 1130 via a local system bus 1150. Various buses may be used to connect the central processing unit 1121 to any of the I/O devices 1130, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 1124, the processor 1121 may use an Advanced Graphics Port (AGP) to communicate with the display 1124. FIG. 11C depicts an embodiment of a computer 1100 in which the main processor 1121 may communicate directly with I/O device 1130b, for example via HYPERTRANSPORT, RAPIDIO, or INFINIBAND communications technology. FIG. 11C also depicts an embodiment in which local busses and direct communication are mixed: the processor 1121 communicates with I/O device 1130a using a local interconnect bus while communicating with I/O device 1130b directly.

A wide variety of I/O devices 1130a-1130n may be present in the computing device 1100. Input devices include keyboards, mice, trackpads, trackballs, microphones, dials, touch pads, touch screen, and drawing tablets. Output devices include video displays, speakers, inkjet printers, laser printers, projectors, and dye-sublimation printers. The I/O devices may be controlled by an I/O controller 1123 as shown in FIG. 11B. The I/O controller may control one or more I/O devices such as a keyboard 1126 and a pointing device 1127, e.g., a mouse or optical pen. Furthermore, an I/O device may also provide storage and/or an installation medium 1116 for the computing device 1100. In still other embodiments, the computing device 1100 may provide USB connections (not shown) to receive handheld USB storage devices such as the USB Flash Drive line of devices manufactured by Twintech Industry, Inc. of Los Alamitos, Calif.

Referring again to FIG. 11B, the computing device 1100 may support any suitable installation device 1116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 1100 may further include a storage device, such as one or more hard disk drives or redundant arrays of independent disks, for storing an operating system and other related software, and for storing application software programs such as any program or software 1120 for implementing (e.g., configured and/or designed for) the systems and methods described herein. Optionally, any of the installation devices 1116 could also be used as the storage device. Additionally, the operating system and the software can be run from a bootable medium.

Furthermore, the computing device 1100 may include a network interface 1118 to interface to the network 1104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 1100 communicates with other computing devices 1100' via any type and/or form of gateway or tunneling protocol such as Secure Socket Layer (SSL) or Transport Layer Security (TLS). The network interface 1118 may include a built-in network adapter, network interface card, PCMCIA network card, card bus network adapter, wireless network adapter, USB network adapter, modem or any other device suitable for interfacing the computing device 1100 to any type of network capable of communication and performing the operations described herein.

In some embodiments, the computing device 1100 may include or be connected to one or more display devices 1124a-1124n. As such, any of the I/O devices 1130a-1130n and/or the I/O controller 1123 may include any type and/or form of suitable hardware, software, or combination of hardware and software to support, enable or provide for the connection and use of the display device(s) 1124a-1124n by the computing device 1100. For example, the computing device 1100 may include any type and/or form of video adapter, video card, driver, and/or library to interface, communicate, connect or otherwise use the display device(s) 1124a-1124n. In one embodiment, a video adapter may include multiple connectors to interface to the display device(s) 1124a-1124n. In other embodiments, the computing device 1100 may include multiple video adapters, with each video adapter connected to the display device(s) 1124a-1124n. In some embodiments, any portion of the operating system of the computing device 1100 may be configured for using multiple displays 1124a-1124n. One ordinarily skilled in the art will recognize and appreciate the various ways and embodiments that a computing device 1100 may be configured to have one or more display devices 1124a-1124n.

In further embodiments, an I/O device 1130 may be a bridge between the system bus 1150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 1100 of the sort depicted in FIGS. 11B and 11C may operate under the control of an operating system, which control scheduling of tasks and access to system resources. The computing device 1100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 1100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 1100 has sufficient processor power and memory capacity to perform the operations described herein.

In some embodiments, the computing device 1100 may have different processors, operating systems, and input devices consistent with the device. For example, in one embodiment, the computing device 1100 is a smart phone, mobile device, tablet or personal digital assistant. In still other embodiments, the computing device 1100 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 1100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices, for example, consistent with the terms "user" and "multi-user" typically used in the context of a multi-user multiple-input and multiple-output (MU-MIMO) environment.

Although examples of communications systems described above may include devices and network devices operating according to DOCSIS 3.1 standard, it should be understood that embodiments of the systems and methods described can operate according to other standards. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system comprising:
   a transmitter circuit configured to transmit a first downstream signal to a first device and a second downstream signal to a second device;
   a first echo cancellation circuit configured to reduce a reflection of the first downstream signal superimposed on a first upstream signal transmitted by the first device to the system, to obtain a first signal;
   a first frequency transformation circuit configured to transform the first signal in a time domain into a corresponding second signal in a frequency domain;
   a second echo cancellation circuit configured to reduce a reflection of the second downstream signal superimposed on a second upstream signal transmitted by the second device to the system, to obtain a third signal;
   a second frequency transformation circuit configured to transform the third signal in the time domain into a corresponding fourth signal in the frequency domain; and a leg combining circuit, the first frequency transformation circuit coupled between the leg combining circuit and the first echo cancellation circuit, the second frequency transformation circuit coupled between the leg combining circuit and the second echo cancellation circuit, the leg combining circuit configured to:
  select, for a group of subcarriers, one of the first frequency transformation circuit and the second frequency transformation circuit, and
  cause, for the group of subcarriers, the selected one of the first frequency transformation circuit and the second frequency transformation circuit to output one of the second signal and the fourth signal, according to the selection.

2. The system of claim 1, wherein the group of subcarriers is selected from groups of subcarriers of orthogonal frequency division multiple access (OFDMA) symbols or orthogonal frequency division multiplexing (OFDM) symbols.

3. The system of claim 1, wherein the leg combining circuit comprises:
  a power detection circuit coupled to the first frequency transformation circuit and the second frequency transformation circuit, the power detection circuit configured to detect, for the group of subcarriers, a first power level of the second signal and a second power level of the fourth signal; and
  a control circuit coupled to the first frequency transformation circuit, the second frequency transformation circuit, and the power detection circuit, the control circuit configured to:
    compare the first power level and the second power level, and
    select, for the group of subcarriers, the one of the first frequency transformation circuit and the second frequency transformation circuit associated with a higher power level of the first power level and the second power level according to the comparison.

4. The system of claim 3, wherein the control circuit is configured to:
  offset the first power level according to a first noise associated with a first connection between the first device and the first frequency transformation circuit, and
  offset the second power level according to a second noise associated with a second connection between the second device and the second frequency transformation circuit.

5. The system of claim 4, wherein the leg combining circuit further comprises:
  a noise detection circuit coupled to the first connection and the second connection, the noise detection circuit configured to detect the first noise during a first time period and the second noise during a second time period.

6. The system of claim 1, wherein the leg combining circuit comprises:
  a control circuit coupled to the first frequency transformation circuit and the second frequency transformation circuit, the control circuit configured to:
    select the second signal to be output during a first time period associated with the first device, and
    select the fourth signal to be output during a second time period associated with the second device.

7. The system of claim 1, wherein the first echo cancellation circuit is (i) coupled between the first frequency transformation circuit and the transmitter circuit, and (ii) coupled between the first frequency transformation circuit and the first device, wherein the echo cancellation circuit is further configured to:
  predict the reflection of the first downstream signal superimposed on the first upstream signal; and
  subtract the predicted reflection of the first downstream signal from the first upstream signal to obtain the first signal.

8. The system of claim 1, further comprising:
  a frequency demodulation circuit coupled to the leg combining circuit, the leg combining circuit coupled between i) the frequency demodulation circuit and ii) the first frequency transformation circuit and coupled between i) the frequency demodulation circuit and ii) the second frequency transformation circuit, the frequency demodulation circuit configured to receive the one of the second signal and the fourth signal from the leg combining circuit, and demodulate the one of the second signal and the fourth signal.

9. The system of claim 1, further comprising:
  a frame buffer coupled to the leg combining circuit,
  wherein the leg combining circuit is further configured to:
    cause, during a first time period, the selected one of the first frequency transformation circuit and the second frequency transformation circuit to output a portion of the one of the second signal and the fourth signal to the frame buffer for the group of subcarriers, and
    cause, during a second time period, the other of the first frequency transformation circuit and the second frequency transformation circuit to output a portion of the other of the second signal and the fourth signal to the frame buffer for another group of sub carriers.

10. A method, comprising:
  transmitting, by a transmitter circuit of a system, a first downstream signal to a first device and a second downstream signal to a second device;
  reducing, by a first echo cancellation circuit of the system coupled to the transmitter circuit, a reflection of the first downstream signal superimposed on a first upstream signal transmitted by the first device to the system, to obtain a first signal;
  transforming, by a first frequency transformation circuit of the system, the first signal in a time domain into a corresponding second signal in a frequency domain;
  reducing, by a second echo cancellation circuit of the system coupled to the transmitter circuit, a reflection of the second downstream signal superimposed on a second upstream signal transmitted by the second device to the system, to obtain a third signal;
  transforming, by a second frequency transformation circuit of the system, the third signal in the time domain into a corresponding fourth signal in the frequency domain;
  selecting, for a group of subcarriers by a leg combining circuit of the system, one of the second signal and the fourth signal, the first frequency transformation circuit coupled between the leg combining circuit and the first echo cancellation circuit, the second frequency transformation circuit coupled between the leg combining circuit and the second echo cancellation circuit; and
  outputting, for the group of subcarriers by the leg combining circuit of the system, the selected one of the second signal and the fourth signal.

11. The method of claim 10, wherein the group of subcarriers is selected from groups of subcarriers of orthogonal frequency division multiple access (OFDMA) symbols or orthogonal frequency division multiplexing (OFDM) symbols.

12. The method of claim 10, wherein selecting the one of the second signal and the fourth signal further comprises:
  detecting, for the group of subcarriers by the leg combining circuit of the system, a first power level of the second signal and a second power level of the fourth signal;
  comparing, by the leg combining circuit of the system, the first power level and the second power level; and
  selecting, by the leg combining circuit of the system, the one of the second signal and the fourth signal according to the comparison.

13. The method of claim 12, wherein selecting the one of the second signal and the fourth signal further comprises:
  offsetting, by the leg combining circuit of the system, the first power level according to a first noise associated with a first connection between the first device and the system, and
  offsetting, by the leg combining circuit of the system, the second power level according to a second noise associated with a second connection between the second device and the system.

14. The method of claim 10, wherein selecting the one of the second signal and the fourth signal further comprises:
  selecting, by the leg combining circuit of the system, the second signal to be output during a first time period associated with the first device; and
  selecting, by the leg combining circuit of the system, the fourth signal to be output during a second time period associated with the second device.

15. The method of claim 10, further comprising:
  predicting, by the first echo cancellation circuit of the system, the reflection of the first downstream signal superimposed on the first upstream signal; and
  subtracting, by the first echo cancellation circuit of the system, the predicted reflection of the first downstream signal from the first upstream signal to obtain the first signal.

16. The method of claim 10, further comprising:
  combining, by the leg combining circuit of the system, a portion of the one of the second signal and the fourth signal received during a first time period for the group of subcarriers, and another portion of the other of the second signal and the fourth signal received during a second time period for another group of subcarriers.

17. A system comprising:
  a first echo cancellation circuit configured to reduce a reflection of a first downstream signal superimposed on a first upstream signal transmitted by a first device to the system, to obtain a first signal, the first downstream signal transmitted by a transmitter circuit to the first device;
  a first frequency transformation circuit configured to transform the first signal in a time domain into a corresponding second signal in a frequency domain;
  a second echo cancellation circuit configured to reduce a reflection of a second downstream signal superimposed on a second upstream signal transmitted by a second device to the system, to obtain a third signal, the second downstream signal transmitted by the transmitter circuit to the second device;
  a second frequency transformation circuit configured to transform the third signal in the time domain into a corresponding fourth signal in the frequency domain; and
  a leg combining circuit, the first frequency transformation circuit coupled between the leg combining circuit and the first echo cancellation circuit, the second frequency transformation circuit coupled between the leg combining circuit and the second echo cancellation circuit, the leg combining circuit configured to:
    detect power levels of the second signal and the fourth signal for a first group of subcarriers of orthogonal frequency division multiple access (OFDMA) symbols or orthogonal frequency division multiplexing (OFDM) symbols, and
    output one of the second signal and the fourth signal for the first group of subcarriers according to the detected power level.

18. The system of claim 17, wherein the leg combining circuit is configured to:
  detect the power levels of the second signal and the fourth signal for the first group of subcarriers during a first time period;
  detect the power levels of the second signal and the fourth signal for a second group of subcarriers during a second time period;
  output the one of the second signal and the fourth signal for the first group of subcarriers during the first time period; and
  output the other of the second signal and the fourth signal for the second group of subcarriers during the second time period.

19. The system of claim 18, further comprising a frame buffer coupled to the leg combining circuit, the frame buffer configured to combine the one of the second signal and the fourth signal for the first group of subcarriers and the other of the second signal and the fourth signal for the second group of subcarriers.

20. The system of claim 17, further comprising:
  a frequency demodulation circuit coupled to the leg combining circuit, the leg combining circuit coupled between i) the frequency demodulation circuit and ii) the first frequency transformation circuit and coupled between i) the frequency demodulation circuit and ii) the second frequency transformation circuit, the frequency demodulation circuit configured to receive the one of the second signal and the fourth signal from the leg combining circuit, and demodulate the one of the second signal and the fourth signal.

* * * * *